United States Patent
Liu et al.

(10) Patent No.: US 12,166,667 B2
(45) Date of Patent: Dec. 10, 2024

(54) PACKET PROCESSING METHOD, APPARATUS, AND SYSTEM

(71) Applicant: Huawei Technologies Co., Ltd., Shenzhen (CN)

(72) Inventors: Bing Liu, Beijing (CN); Shuping Peng, Beijing (CN); Zhenbin Li, Beijing (CN); Xia Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 165 days.

(21) Appl. No.: 17/738,765

(22) Filed: May 6, 2022

(65) Prior Publication Data
US 2022/0263751 A1    Aug. 18, 2022

Related U.S. Application Data

(63) Continuation of application No. PCT/CN2020/105005, filed on Jul. 28, 2020.

(30) Foreign Application Priority Data

Nov. 7, 2019   (CN) .......................... 201911084038.0
Dec. 31, 2019  (CN) .......................... 201911426082.5

(51) Int. Cl.
*H04L 45/24*       (2022.01)
*H04L 12/46*       (2006.01)
(Continued)

(52) U.S. Cl.
CPC .......... *H04L 45/24* (2013.01); *H04L 12/4633* (2013.01); *H04L 45/64* (2013.01);
(Continued)

(58) Field of Classification Search
CPC ......... H04L 45/00; H04L 45/02; H04L 45/04; H04L 45/24; H04L 45/34; H04L 45/64;
(Continued)

(56) References Cited

U.S. PATENT DOCUMENTS 9,178,816 B1   11/2015 Ojha et al.
2006/0209885 A1*  9/2006 Hain ..................... H04L 69/167
                                                          370/465
(Continued)

FOREIGN PATENT DOCUMENTS

CN     102098353 A    6/2011
CN     108781171 A    11/2018
(Continued)

OTHER PUBLICATIONS

C. Filsfils, Ed. et al, "SRv6 Network Programming," draft-ietf-spring-srv6-network-programming-04, Oct. 7, 2019, 47 pages.

*Primary Examiner* — Bryan Y Lee
(74) *Attorney, Agent, or Firm* — Conley Rose, P.C.

(57) ABSTRACT

A packet processing method includes determining, by a node in a first network, a transmission path for a packet, where the transmission path includes a path in the first network and a path traversing a second network; adding, by the node, path information to the packet based on the transmission path, where the path information includes traversal indication information, and the traversal indication information indicates an ingress node in the second network to encapsulate and transmit the packet based on an egress node that is specified in the traversal indication information and that is located in the second network; and sending, by the node to the ingress node in the second network through the first network, the packet to which the traversal indication information is added.

20 Claims, 13 Drawing Sheets

(51) Int. Cl.
*H04L 45/64* (2022.01)
*H04L 45/741* (2022.01)
*H04L 45/745* (2022.01)
*H04L 61/251* (2022.01)

(52) U.S. Cl.
CPC .......... *H04L 45/741* (2013.01); *H04L 45/745* (2013.01); *H04L 61/251* (2013.01)

(58) Field of Classification Search
CPC . H04L 45/745; H04L 12/4633; H04L 61/251; H04L 45/741
USPC ................................. 709/220–229, 138–244
See application file for complete search history.

(56) References Cited

U.S. PATENT DOCUMENTS

| | | | |
|---|---|---|---|
| 2007/0091897 A1* | 4/2007 | Lee | H04L 47/18 370/395.5 |
| 2017/0250907 A1 | 8/2017 | Pignataro et al. | |
| 2018/0026884 A1 | 1/2018 | Nainar et al. | |
| 2020/0036610 A1* | 1/2020 | Indiresan | H04L 69/22 |
| 2020/0127913 A1* | 4/2020 | Filsfils | H04L 45/50 |

FOREIGN PATENT DOCUMENTS

| | | |
|---|---|---|
| CN | 109379359 A | 2/2019 |
| CN | 109495385 A | 3/2019 |
| CN | 109995655 A | 7/2019 |

\* cited by examiner

Outer IPv4 Header

| Version | IHL | Type of Service | Total Length | |
|---|---|---|---|---|
| Identification | | | Flags | Fragment Offset |
| Time to Live | | Protocol=17(UDP) | Header Checksum | |
| Outer Source IPv4 Address | | | | |
| Outer Destination IPv4 Address | | | | |

UDP Header

| Source Port | Dest Port=4790 |
|---|---|
| UDP Length | UDP Checksum |

VXLAN-GPE Header

| P | R | Ver | I | P | R | O | Reserved | N.Protocol=0x2 |
|---|---|---|---|---|---|---|---|---|
| VXLAN Network Identifier (VNI) | | | | | | | | Reserved |

FIG. 10

Outer IPv4 Header

| Version | IHL | Type of Service | Total Length | |
|---|---|---|---|---|
| Identification | | | Flags | Fragment Offset |
| Time to Live | | Protocol=17(UDP) | Header Checksum | |
| Outer Source IPv4 Address | | | | |
| Outer Destination IPv4 Address | | | | |

UDP Header

| Source Port | Dest Port=6081 |
|---|---|
| UDP Length | UDP Checksum |

GENEVE Header

| Ver | Opt Len | O | C | Rsvd | Protocol Type=0x86DD |
|---|---|---|---|---|---|
| Virtual Network Identifier (VNI) | | | | | Reserved |
| Variable Length Options | | | | | |

FIG. 11

Outer IPv4 Header

| Version | IHL | Type of Service | Total Length | |
|---|---|---|---|---|
| Identification | | | Flags | Fragment Offset |
| Time to Live | | Protocol=17(UDP) | Header Checksum | |
| Outer Source IPv4 Address | | | | |
| Outer Destination IPv4 Address | | | | |

UDP Header

| Source Port | Dest Port=4789 |
|---|---|
| UDP Length | UDP Checksum |

VXLAN Header

| R | R | R | R | I | R | R | R | Reserved |
|---|---|---|---|---|---|---|---|---|
| VXLAN Network Identifier (VNI) | | | | | | | | Reserved |

Inner Ethernet Header

| Inner Destination MAC Address | |
|---|---|
| Inner Destination MAC Address | Inner Source MAC Address |
| Inner Source MAC Address | |
| OptnlEthtype=C-Tag 802.1Q | Inner VLAN Tag Information |
| Ethertype=0x86DD | |

FIG. 12

Outer IPv4 Header

| Version | IHL | Type of Service | Total Length | |
|---|---|---|---|---|
| Identification | | | Flags | Fragment Offset |
| Time to Live | | Protocol=17(UDP) | Header Checksum | |
| (Outer) Source IPv4 Address | | | | |
| (Outer) Destination IPv4 Address | | | | |

GRE Header

| 0 | 1 | 0 | Reserved0 | Ver | Protocol Type 0x6558 |
|---|---|---|---|---|---|
| Virtual Subnet ID (VSID) | | | | | FlowID |

Inner Ethernet Header

| (Inner) Destination MAC Address | |
|---|---|
| (Inner) Destination MAC Address | (Inner) Source MAC Address |
| (Inner) Source MAC Address | |
| Ethertype=0x86DD | |

FIG. 13

PACKET PROCESSING METHOD, APPARATUS, AND SYSTEM

CROSS-REFERENCE TO RELATED APPLICATIONS

This is a continuation of International Patent Application PCT/CN2020/105005 filed on Jul. 28, 2020, which claims priority to Chinese Patent Application No. 201911426082.5 filed on Dec. 31, 2019, which claims priority to Chinese Patent Application No. 201911084038.0 filed on Nov. 7, 2019, all of which are hereby incorporated by reference in their entireties.

TECHNICAL FIELD

The present disclosure relates to the communication field, and in particular, to a packet processing technology.

BACKGROUND

Segment routing (SR) is a source routing technology. A head node of an SR tunnel specifies a path for a packet, and converts the path into an ordered segment list to encapsulate the ordered segment list into a packet header. An intermediate node on the path needs to perform forwarding only based on the specified path in the packet header. The head node of the SR tunnel is the 1$^{st}$ node encountered after the packet enters the SR tunnel. When the SR is deployed on an Internet Protocol (IP) version 6 (IPv6) data plane, the SR is referred to as SR over IPv6 (SRv6). To support a segment routing protocol in IPv6, an extension header, namely, a segment routing header (SRH), is added after a basic IPv6 header, to obtain an SRv6 data packet. The SRH extension header carries a segment list. Each segment is identified by using a 128-bit IPv6 address, and packet forwarding depends on information encoded by using an IPv6 address. In an IPv6 router, a segment list can be represented only by using a segment identifier (SID) that is in a form of an IPv6 address. Otherwise, forwarding cannot be performed. Therefore, the segment list in the SRH is an explicit SID stack. An intermediate node continuously updates a destination address and offsets the SID stack, to complete hop-by-hop forwarding. The SRv6 controls, on the head node of the SR tunnel, a forwarding path based on the foregoing processing.

However, a forwarding plane of the SRv6 is IPv6. If there is a non-IPv6 network (for example, a network that supports only IP version 4 (IPv4) forwarding), an SRv6 packet needs to traverse the network by using another technology. In an existing related technology, a path selection policy is independently configured on an edge node connected to both the non-IPv6 network and the IPv6 network, to traverse the non-IPv6 network. A plurality of paths may exist on a same edge node. When receiving an IPv6 packet on an edge node, the edge node selects, based on the configured path selection policy, a path to traverse an IPv4 network.

In the existing related technology, because the independent path selection policy further needs to be deployed on the edge node when the packet traverses the non-IPv6 network, resources are wasted, and the head node of the SR tunnel cannot control an end-to-end forwarding path.

SUMMARY

Embodiments of this application provide a packet processing method, apparatus, and system, to implement end-to-end transmission control on an IPv6 packet.

According to a first aspect, this application provides a packet processing method. In this method, a node in a first network determines a transmission path for a packet, where the transmission path includes a path in the first network and a path traversing a second network. The node in the first network adds path information to the packet based on the determined transmission path. The path information includes traversal indication information, and the traversal indication information indicates an egress node of the packet in the second network. The node in the first network sends, to an ingress node in the second network through the first network, the packet to which the traversal indication information is added, to indicate the ingress node in the second network to encapsulate and transmit the packet based on the egress node that is specified in the traversal indication information and that is located in the second network.

The node in the first network selects a tunnel exit in the second network, and the ingress node in the second network is indicated by the traversal indication information to perform routing based on the specified egress node, so that independent deployment of a routing policy on the ingress node in the second network is avoided. This reduces resource overheads. In addition, the node in the first network further controls the end-to-end forwarding path.

In a specific implementation, the path information may include an SID of an intermediate node on the path in the first network and an SID of the ingress node in the second network, and the traversal indication information is included in the SID of the ingress node in the second network. The traversal indication information is carried in the SID of the ingress node in the second network by reconstructing the SID, so that much reconstruction performed on a device is avoided, thereby reducing costs.

In a specific implementation, before determining the transmission path, the node in the first network further receives at least one SID advertised by the ingress node in the second network. Different SIDs carry different traversal indication information. When adding the path information to the packet, the node in the first network uses an SID corresponding to the path that is determined by the node in the first network based on the traversal indication information and that traverses the second network as the SID of the ingress node in the second network, and adds the SID to the path information. Different SIDs carry different traversal indication information, to indicate different traversal paths, so that the node in the first network selects a traversal path by selecting an SID, and a head node controls an end-to-end forwarding path in a manner with relatively low costs.

In a specific implementation, the traversal indication information further indicates a tunnel encapsulation type used when the packet traverses the second network. After the packet reaches the ingress node in the second network, the ingress node is indicated by the traversal indication information to encapsulate the packet based on the tunnel encapsulation type. By using the traversal indication information, the node in the first network not only controls the traversal path, but also further selects a type of the traversal tunnel, so that the node in the first network can flexibly select a path based on a service status, thereby improving flexibility of the node in the first network.

In a specific implementation, the traversal indication information may further indicate content that needs to be copied during encapsulation. After the packet reaches the ingress node in the second network, the ingress node is indicated by the traversal indication information to copy, when encapsulating the packet, the content that needs to be copied from a packet header of a protocol supported by the first network to a packet header of a protocol supported by the second network after the packet is encapsulated. A copy capability is implemented by using the traversal indication information, so that a capability of the packet in an original network can be migrated to another network, thereby ensuring that a service capability is not lost in a traversal process.

In a specific implementation, the content that needs to be copied is in-situ operation, administration, and maintenance (OAM) information or in-band OAM (IOAM).

In this implementation, IOAM information in the packet header of the protocol supported by the first network is copied to the packet header that is newly added after the packet is encapsulated and that belongs to the protocol supported by the second network, to collect IOAM data on the end-to-end path. In this way, OAM-related information of the entire network can be obtained more accurately.

In a specific implementation, the tunnel encapsulation type indicated in the traversal indication information is network virtualization over layer 3 (NVO3). The NVO3 includes a Virtual Extensible local area network (LAN) (VXLAN), a Generic Protocol Extension for a VXLAN (VXLAN-GPE), or Generic Network Virtualization Encapsulation (GENEVE).

In a specific implementation, the first network is an IPv6 network, and the second network is an IPv4 network.

According to a second aspect, this application provides a packet processing method. In this method, an ingress node in a second network receives a packet from a first network, where the packet carries traversal indication information, and the traversal indication information indicates an egress node of the packet in the second network. The ingress node encapsulates the packet based on the traversal indication information, to change a format of the packet to a format supported by the second network. A destination address of the encapsulated packet is the egress node indicated in the traversal indication information. The ingress node routes the encapsulated packet to the egress node.

The ingress node in the second network routes the packet based on the traversal indication information in the packet sent by the first network, to avoid independent deployment of a routing policy on the ingress node in the second network. This reduces resource overheads. In addition, the node in the first network controls the end-to-end forwarding path.

In a specific implementation, the packet carries an SID of the ingress node, and the traversal indication information is carried in the SID of the ingress node. The traversal indication information is carried in the SID of the ingress node in the second network by reconstructing the SID, so that much reconstruction performed on a device is avoided, thereby reducing costs.

In a specific implementation, the method may be applied to a scenario in which an IPv4 network is traversed in an IPv6 network, where the first network is the IPv6 network, and the second network is the IPv4 network. A specific implementation process in which the ingress node encapsulates the packet based on the traversal indication information, to change the format of the packet to the format supported by the second network includes that the ingress node encapsulates an IPv4 packet header outside the packet, sets a source address of the IPv4 packet header as an IPv4 address of the ingress node or an IPv4 address of an interface corresponding to the ingress node, and sets a destination address of the IPv4 packet header as an IPv4 address of the egress node in the traversal indication information or an IPv4 address of an interface corresponding to the egress node. The ingress node in the IPv4 network is indicated by the traversal indication information to perform routing based on the specified egress node, so that the IPv4 network is traversed in the IPv6 network when no independent routing policy is deployed on the ingress node, thereby reducing resource overheads.

In a specific implementation, the traversal indication information further indicates a tunnel encapsulation type used when the packet traverses the second network. When encapsulating the packet, to change the format of the packet to the format supported by the second network, the ingress node establishes a transmission tunnel to the egress node based on the tunnel encapsulation type indicated in the traversal indication information. By using the traversal indication information, the node in the first network not only controls the traversal path, but also further selects a type of the traversal tunnel, so that the node in the first network can flexibly select a path based on a service status, thereby improving flexibility of the node in the first network.

In a specific implementation, the tunnel encapsulation type indicated in the traversal indication information is NVO3.

In a specific implementation, the traversal indication information further indicates content that needs to be copied during encapsulation. When encapsulating the packet, to change the format of the packet to the format supported by the second network, the ingress node copies, to the IPv4 packet header, the content that is indicated in the traversal indication information and that needs to be copied. A copy capability is implemented by using the traversal indication information, so that a capability of the packet in an original network can be migrated to another network, thereby ensuring that a service capability is not lost in a traversal process.

In a specific implementation, before receiving the packet from the first network, the ingress node in the second network advertises at least one SID, where different advertised SIDs carry different traversal indication information. Different SIDs carry different traversal indication information, to indicate different traversal paths, so that the node in the first network selects a traversal path by selecting an SID, and the node in the first network controls an end-to-end forwarding path in a manner with relatively low costs.

According to a third aspect, an embodiment of this application provides a packet processing apparatus, including a unit for performing the method described in any one of the first aspect or the specific implementations of the first aspect.

For technical effects of the packet processing apparatus and each embodiment thereof, refer to specific descriptions in the first aspect and the optional implementations. Details are not described herein one by one again.

According to a fourth aspect, an embodiment of this application provides a packet processing apparatus, including a unit for performing the method described in any one of the second aspect or the specific implementations of the second aspect.

For technical effects of the packet processing apparatus and each embodiment thereof, refer to specific descriptions in the second aspect and the optional implementations. Details are not described herein one by one again.

According to a fifth aspect, an embodiment of this application provides a packet processing apparatus, including a processor, a communication interface, and a memory. The memory is configured to store instructions, the processor is configured to execute the instructions, and the communication interface is configured to receive or send a packet. When executing the instructions, the processor performs the method described in any one of the first aspect or the specific implementations of the first aspect.

For technical effects of the packet processing apparatus and each embodiment thereof, refer to specific descriptions in the first aspect and the optional implementations. Details are not described herein one by one again.

According to a sixth aspect, an embodiment of this application provides a packet processing apparatus, including a processor, a communication interface, and a memory. The memory is configured to store instructions, the processor is configured to execute the instructions, and the communication interface is configured to receive or send a packet. When executing the instructions, the processor performs the method described in any one of the second aspect or the specific implementations of the second aspect.

For technical effects of the packet processing apparatus and each embodiment thereof, refer to specific descriptions in the second aspect and the optional implementations. Details are not described herein one by one again.

According to a seventh aspect, this application provides a computer storage medium, where the computer medium stores a computer program for network fault locating. When the computer program is executed by a processor, the method described in any one of the first aspect or the specific implementations of the first aspect is implemented.

For technical effects of the packet processing apparatus and each embodiment thereof, refer to specific descriptions in the first aspect and the optional implementations. Details are not described herein one by one again.

According to an eighth aspect, this application provides a computer storage medium, where the computer medium stores a computer program for network fault locating. When the computer program is executed by a processor, the method described in any one of the second aspect or the specific implementations of the second aspect is implemented.

For technical effects of the packet processing apparatus and each embodiment thereof, refer to specific descriptions in the second aspect and the optional implementations. Details are not described herein one by one again.

According to a ninth aspect, an embodiment of this application provides a chip, including a processor and an interface circuit. The interface circuit is configured to receive instructions and transmit the instructions to the processor. The processor is configured to receive the instructions from the interface circuit, to perform the method described in any one of the first aspect or the specific implementations of the first aspect, or implement the method described in any one of the second aspect or the specific implementations of the second aspect.

Optionally, there may be one or more processors in the chip system. The processor may be implemented by using hardware or software. When the processor is implemented by using the hardware, the processor may be a logic circuit, an integrated circuit, or the like. When the processor is implemented by using the software, the processor may be a general-purpose processor, and is implemented by reading software code stored in a memory.

Optionally, the chip further includes one or more memories. The memory may be integrated with the processor, or may be disposed separately from the processor.

For technical effects of the packet processing apparatus and each embodiment thereof, refer to specific descriptions in the first aspect and the optional implementations or specific descriptions in the second aspect and the optional implementations. Details are not described herein one by one again.

According to a tenth aspect, an embodiment of this application provides a packet processing system. The system includes the packet processing apparatus described in the third aspect or the fifth aspect and the packet processing apparatus described in the fourth aspect or the sixth aspect.

For technical effects of each embodiment of the packet processing system, refer to specific descriptions in the first aspect and the second aspect and the optional implementations. Details are not described herein one by one again.

BRIEF DESCRIPTION OF DRAWINGS

FIG. 10 is a schematic diagram of a format of a packet encapsulated based on a VXLAN-GPE according to an embodiment of this application;

FIG. 11 is a schematic diagram of a format of a packet encapsulated based on GENEVE according to an embodiment of this application;

FIG. 12 is a schematic diagram of a format of a packet encapsulated based on a VXLAN according to an embodiment of this application;

FIG. 13 is a schematic diagram of a format of a packet encapsulated based on Network Virtualization using Generic Routing Encapsulation (NVGRE) according to an embodiment of this application;

DESCRIPTION OF EMBODIMENTS

Figure 1:
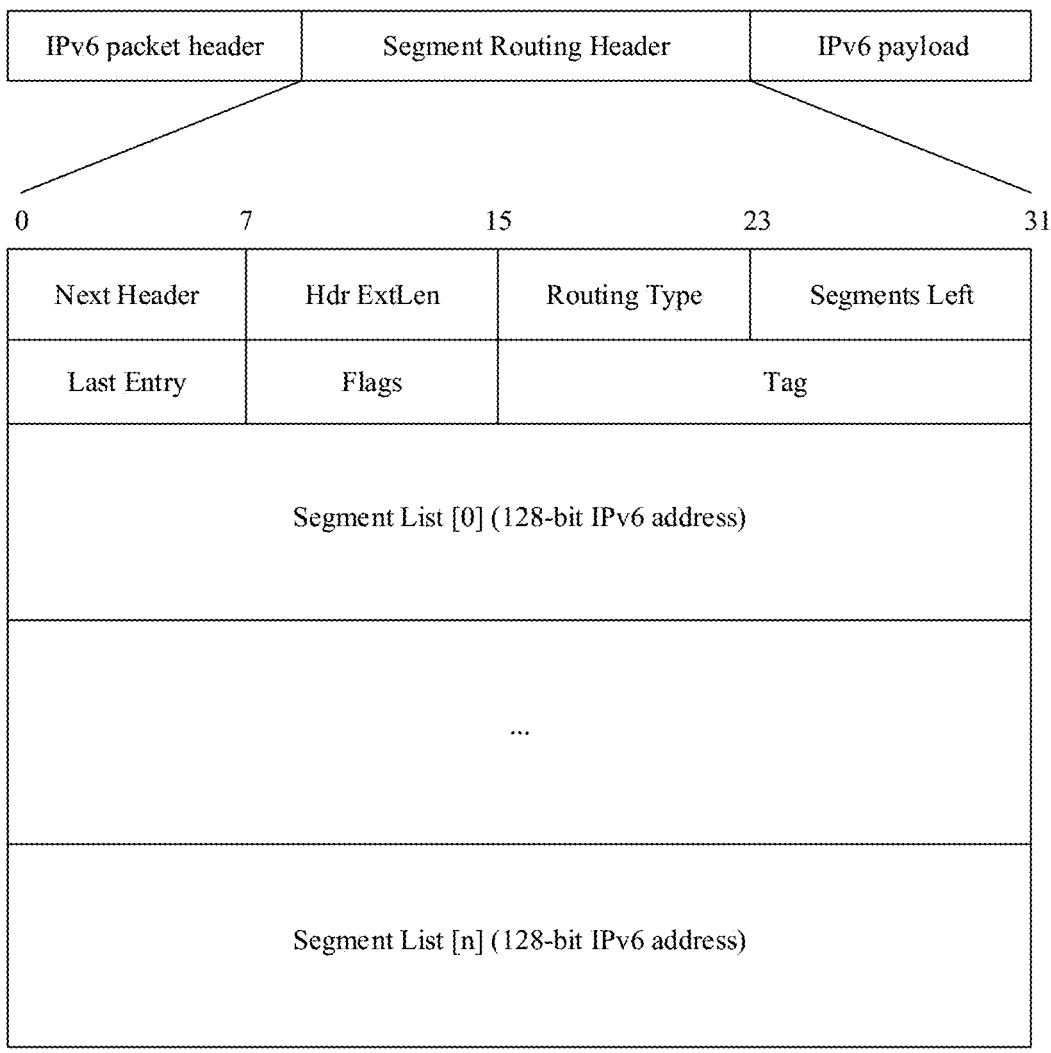
FIG. 1 is a schematic diagram of a format of an SRH extension header according to an embodiment of this application.

The following describes the present disclosure in detail with reference to the accompanying drawings and specific embodiments. However, it should be noted that the following embodiments are only examples for ease of understanding of the technical solutions, but are not intended to limit the present disclosure.

The embodiments of this application are mainly applied to a scenario in which a packet is transmitted by using a traversal technology. Generally, when a second network different from a first network exists in the first network for packet transmission, the traversal technology needs to be used to traverse the second network, to complete packet transmission. In the embodiments of this application, when the network needs to be traversed, a node in the first network determines a packet transmission path, where the packet transmission path includes a transmission path in the first network and a path traversing the second network. The node in the first network in the embodiments of this application is a head node of an SR tunnel established in the first network. The node in the first network adds end-to-end path information to a packet based on the determined path. The path information includes traversal indication information, used to indicate an ingress node and an egress node of the packet in the second network. After receiving the packet, the ingress node in the second network encapsulates the packet based on the traversal indication information in the packet, to change a format of the packet to a format supported by the second network, and routes the encapsulated packet to the specified egress node, to complete traversal. In this way, the node in the first network selects a tunnel exit in the second network, and the ingress node in the second network is indicated by the traversal indication information to perform routing based on the specified egress node, so that independent deployment of a routing policy on the ingress node in the second network is avoided. This reduces resource overheads. In addition, the node in the first network further controls the end-to-end forwarding path.

In a specific embodiment, the node in the first network may not only indicate the ingress node and the egress node in the second network by using the traversal indication information, but also indicate, by using the traversal indication information, a tunnel encapsulation type that needs to be used. After receiving the packet, the ingress node in the second network encapsulates the packet based on the tunnel encapsulation type specified in the traversal indication information. The node in the first network may further copy information from the packet before encapsulation to a packet after encapsulation by using the traversal indication information. Further, the node in the first network may indicate, in the traversal indication information, the information that needs to be copied. When encapsulating the packet, the ingress node in the second network copies the information that is specified in the traversal indication information and that needs to be copied.

An implementation process of the embodiments of this application is described in detail below by using an example in which an IPv4 network that needs to be traversed exists in an IPv6 network.

In the implementation process of the embodiments of this application, packet changing is involved. Therefore, for ease of understanding, a format of a packet transmitted in the IPv6 network is first described briefly.

The packet transmitted in the IPv6 network is an IPv6 packet that uses an IPv6 protocol or an SRv6 packet obtained through extension of an IPv6 packet. The solution provided in the embodiments of this application may be implemented based on the SRv6 packet. The IPv6 packet includes a standard IPv6 header, an extension header (0 . . . n), and a payload. To implement SRv6 based on an IPv6 forwarding plane, an IPv6 extension header, which is referred to as an SRH, is newly added. The extension header specifies an explicit IPv6 path, and stores information about an IPv6 segment list. A head node of an SRv6 tunnel adds an SRH extension header to an IPv6 packet (to obtain the SRv6 packet), and an intermediate node can perform forwarding based on path information included in the SRH extension header. FIG. 1 shows a format of an SRH extension header according to an embodiment of this application.

Each field in the SRH extension header shown in FIG. 1 is explained as follows.

Next Header field: A length of the Next Header field is 8 bits, and the Next Header field is used to identify a type of a packet header following the SRH.

Hdr Ext Len field: A length of the Hdr Ext Len field is 8 bits, and the Hdr Ext Len field is used to indicate a length of the SRH extension header, which is a length of a part, other than the first four bytes, of the SRH header.

Routing Type field: A length of the Routing Type field is 8 bits, and the Routing Type field is used to identify a type of a routing header, where an SRH type is 4.

Segments Left field: A length of the Segments Left field is 8 bits, and the Segments Left field is used to indicate a quantity of intermediate nodes that still need to be accessed before a destination node is reached.

Last Entry field: A length of the Last Entry field is 8 bits, and the Last Entry field is used to indicate an index of the last element in a segment list.

Flags field: A length of the Flags field is 8 bits, and the Flags field indicates some identifiers of data packets.

Tag field: A length of the Tag field is 16 bits, and the Tag field identifies data packets in a same group.

Segment List [n] field: A length of the Segment List [n] field is 128*n bits, this field forms a segment list, and the segment list is encoded from the last segment of a path. The segment list is in a form of an IPv6 address.

Figure 2:
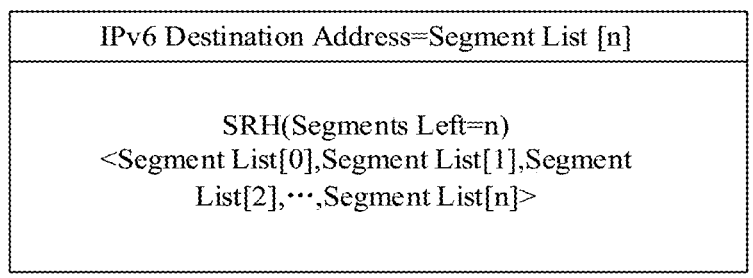
FIG. 2 is a schematic diagram of an abstract format of an SRH extension header according to an embodiment of this application.

For ease of describing a forwarding principle, the SRH extension header shown in FIG. 1 may be abstracted into a form shown in FIG. 2.

Each field in FIG. 2 is described as follows. IPv6 Destination Address field: The IPv6 Destination Address field indicates a destination address of an IPv6 packet, and is referred to as an IPv6 DA for short. In a common IPv6 packet, an IPv6 DA is fixed. In an SRv6 packet, an IPv6 DA identifies only a next node of the current packet, and is changeable.

<Segment List [0], Segment List [1], Segment List [2], . . . , Segment List [n]> field: The <Segment List [0], Segment List [1], Segment List [2], . . . , Segment List [n]> field indicates segment lists of an SRv6 packet, where the segment lists are generated on an ingress node. A segment list [0] is the $1^{st}$ SRv6 segment that needs to be processed on an SRv6 path, a segment list [1] is the $2^{nd}$, a segment list [2] is the $3^{rd}$, . . . , and a segment list [n] is the $(n+1)^{th}$.

Figure 3:
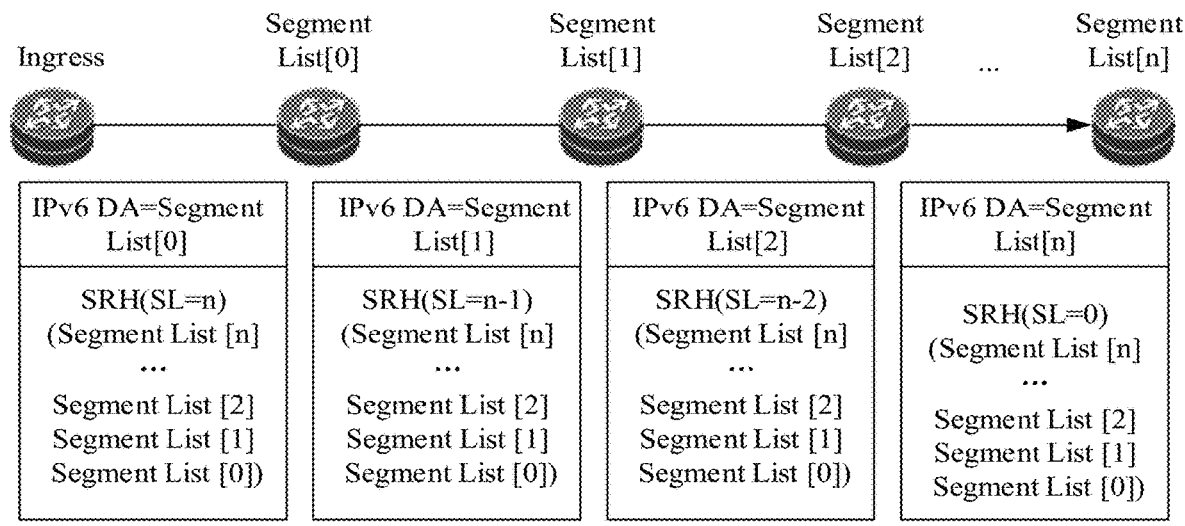
FIG. 3 is a schematic diagram of an IPv6 destination address (DA) change according to an embodiment of this application.

As shown in FIG. 3, each time when an SRv6 node is passed through, a Segments Left (SL) in an SRv6 packet is decreased by one, and IPv6 DA information is changed for one time. The IPv6 DA information is determined by the Segments Left field and a Segment List field together. If a value of the SL field is n (that is, n−0), a value of the IPv6 DA is a value of the segments list [0].

If a value of the SL field is n−1, a value of the IPv6 DA is a value of the segments list [1];

if a value of the SL field is n−2, a value of the IPv6 DA is a value of the segments list [2];

if a value of the SL field is 0 (n−n=0), a value of the IPv6 DA is a value of the segments list [n].

It should be noted that the field or the packet structure in the foregoing embodiments is merely intended to describe the SRv6 packet and a rule thereof. This application is not limited thereto. During specific practice, some specific-implementation-level changes that do not change a basic principle may be made based on different implementation scenarios.

Figure 4:
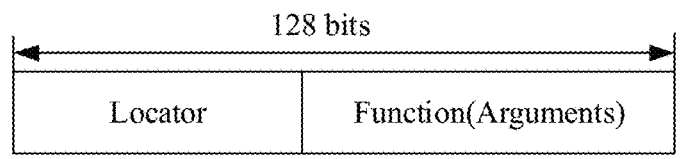
FIG. 4 is a schematic diagram of a structure of an SRv6 SID according to an embodiment of this application.

The segment list in the segment list field is in a form of an IPv6 address, and generally, may also be referred to as an SID. FIG. 4 is a schematic diagram of a format of an SRv6 SID according to an embodiment of this application. The SID includes a Locator field (Locator) and a Function field (Function), and a corresponding format is Locator: Function. The Locator field occupies a high bit of an IPv6 address, and the Function part occupies a remaining part of the IPv6 address.

The Locator field has a locating function, and therefore needs to be unique in an SR domain. After a node configures the Locator field, a system generates a Locator network segment route, and propagates the Locator network segment route in the SR domain by using an IGP. Another node in the network may locate the node by using the Locator network segment route, and all SRv6 SIDs advertised by the node are reachable by using the Locator network segment route. The Function field represents an instruction of a device. The instruction may be preset by the device. The Function part is used to indicate a node that generates the SID to perform a corresponding function operation. An optional parameter segment field (Arguments) may further be separated from the Function part. In this case, the format of the SRv6 SID is changed to Locator: Function: Arguments. The Arguments field occupies a low bit of the IPv6 address, and can be used to define some information such as a packet flow and a service. Both the Function field and the Arguments field can be defined.

There are many types of SRv6 SIDs, and different types of SRv6 SIDs represent different functions.

An embodiment of this application proposes a new SRv6 SID function, that is, proposes a new SID type, to indicate behavior of a new network node. The new SID type defined in this embodiment of this application may be represented as: End.T4.Encaps, where a full name of End.T4.Encaps is that Endpoint encapsulates the original SRv6 packet into an IPv4 tunnel. During specific implementation, a new bit may be defined in a Function part of an SID to represent the new network behavior. The newly defined bit and a meaning represented by the bit may be advertised by a control plane to each node on a forwarding plane, so that the node on the forwarding plane can identify and use the new type of SID. The network behavior defined by the newly defined SID in this embodiment of this application is a network traversal behavior. Traversal indication information may be included, and is used to indicate a behavior of an edge node, corresponding to the SID, in an IPv4 network when an SRv6 packet traverses the IPv4 network and when the edge node receives the SRv6 packet. Further, the traversal indication information in the SID may indicate an egress node when the packet traverses the IPv4 network, and may further indicate a tunnel encapsulation type used when the packet traverses the IPv4 network, or indicate information that needs to be copied to the packet, encapsulated to change a format of the packet to an IPv4 format, when the packet traverses the IPv4 network.

Figure 5:
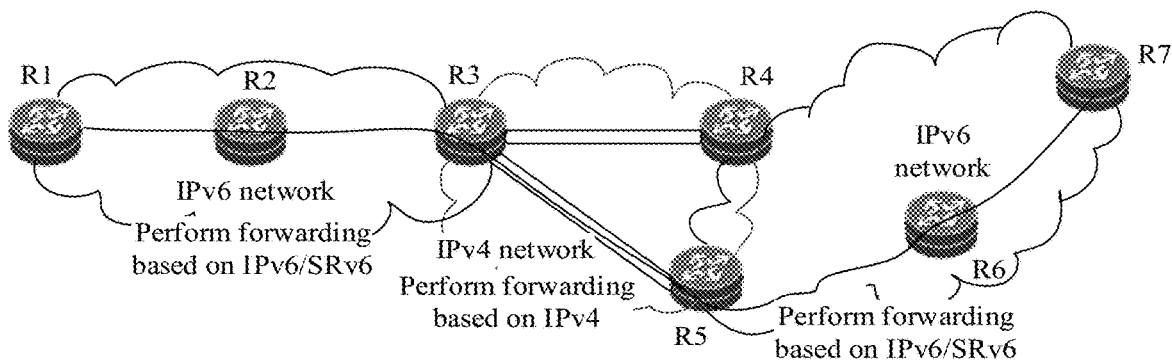
FIG. 5 is a schematic diagram of an application scenario according to an embodiment of this application.

The following describes in detail application of the new SID with reference to an application scenario. FIG. 5 is a schematic diagram of a scenario to which an embodiment of this application is applied. As shown in FIG. 5, there are three segments of networks, namely, two segments of IPv6 networks and one segment of IPv4 network, in a network. The IPv6 network is a first network in this embodiment of this application, and the IPv4 network is a second network that needs to be traversed in this embodiment of this application. An SRv6 packet sent by R1 needs to pass through the intermediate IPv4 network and reach R7. Three network devices, namely, R3, R4, and R5, are edge nodes in the IPv4 network, and support IPv4/IPv6 dual stack. A tunnel exists both between R3 and R4 and between R3 and R5. When the SRv6 packet reaches R3, R4 or R5 may be selected as a tunnel exit.

In this embodiment of this application, when advertising an SID of the edge node, the edge node may use the SID newly defined in this embodiment of this application. For example, R3 in FIG. 5 may advertise two SIDs: an SID 1 and an SID 2. A Function part of the SID 1 indicates that an egress node when the packet traverses the IPv4 network is R5. A Function part of the SID 2 indicates that an egress node when the packet traverses the IPv4 network is R4. During specific implementation, the edge node may further indicate, in the Function part of the SID, a tunnel encapsulation type used during traversal, content that needs to be copied to the encapsulated packet during traversal, or the like.

Figure 6:
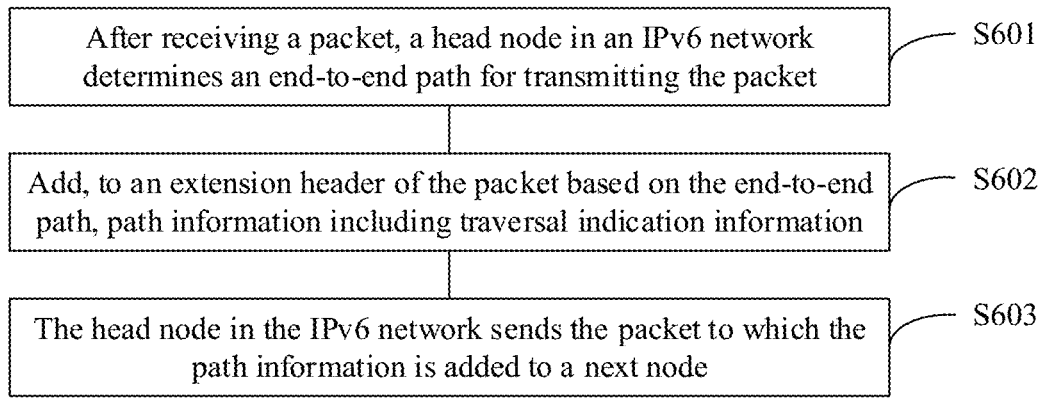
FIG. 6 is a flowchart of processing a packet by a node in a first network according to an embodiment of this application.

The following describes, by using the scenario shown in FIG. 5 as an example, a method in which an SRv6 packet traverses an IPv4 network according to an embodiment of this application. FIG. 6 is a flowchart of processing a packet by a head node of an SRv6 tunnel in an IPv6 network according to an embodiment of this application. As shown in FIG. 6, a processing process of the head node includes the following steps.

S601: After receiving a packet, a head node in the IPv6 network determines an end-to-end path for transmitting the packet.

The IPv6 network is an SRv6 network in which SR is deployed. The head node in the IPv6 network is the head node of the SRv6 tunnel established in the IPv6 network, namely, the 1$^{st}$ node (that is, an ingress node of the packet in the SRv6 network) encountered after the packet enters the SRv6 tunnel, for example, the node R1 in FIG. 5.

After receiving the packet, the head node selects the end-to-end transmission path for the packet, where the end-to-end path includes a transmission path in the SRv6 network and a path traversing an IPv4 network. The path traversing the IPv4 network may be a tunnel by which an ingress node and an egress node in the IPv4 network are determined. Using FIG. 5 as an example, R1 may select R3 as the ingress node in the IPv4 network, and select R5 as the egress node in the IPv4 network.

It should be noted that the ingress node and the egress node in the IPv4 network are edge nodes connected to both the IPv4 network and the IPv6 network, and support IPv4/IPv6 dual stack.

S602: The head node in the IPv6 network adds path information to an extension header of the packet based on the end-to-end path. The path information includes traversal indication information, and the traversal indication information is used to indicate the ingress node and the egress node of the packet in the IPv4 network.

The path information may exist in a form of a segment list in an SRv6 packet format. Further, the head node may add the path information to an SRH extension header of the packet, and store, in a segment list in the SRH extension header, an SID of an intermediate node on the end-to-end path. An SID that is carried in the packet and that is of the ingress node in the IPv4 network may be an SID having a newly added function provided in this embodiment of this application. The traversal indication information is carried in the SID, and is used to specify behavior of the ingress node in the IPv4 network.

It should be noted that the ingress node in the IPv4 network may advertise a plurality of SIDs, and different SIDs carry different traversal indication information. For example, in FIG. 5, R3 advertises an SID 1 and an SID 2. Traversal indication information in the SID 1 indicates that an egress node when the packet traverses the IPv4 network is R5. Traversal indication information in the SID 2 indicates that an egress node when the packet traverses the IPv4 network is R4. When adding the end-to-end path information to the packet, the head node may use an SID corresponding to the path that is determined by the head node based on the traversal indication information and that traverses the second network as the SID of the ingress node in the IPv4 network, and adds the SID to the end-to-end path information. For example, in this embodiment, for the path that is determined by the head node and that traverses the IPv4 network, R3 is used as the ingress node in the IPv4 network, and R5 is used as the egress node in the IPv4 network. Therefore, the head node may select the SID 1 as the SID of the ingress node in the IPv4 network, and add the SID 1 to the path information.

In this embodiment, the traversal indication information may further indicate a tunnel type used when the packet traverses the IPv4 network. For example, the tunnel type is NVO3.

S603: The head node in the IPv6 network sends the packet to which the path information is added to a next node.

For example, the head node R1 in FIG. 5 sends, to an intermediate node R2, the packet to which the path information is added. After receiving the packet, the intermediate node R2 continues to send the packet to the next node R3 based on a node address in the segment list in the packet. Till this step, an existing processing process may be used, and details are not described herein again.

The foregoing process is the processing process performed by the head node for transmitting the packet. In this process, aside from having a capability of selecting the path in the IPv6 network (where the capability is implemented by using the SRv6 SRH), the head node in the IPv6 network further needs to have a capability of selecting a tunnel exit for traversing the IPv4 network. The ingress node in the IPv4 network is indicated by the traversal indication information to perform routing based on the specified egress node, so that independent deployment of a routing policy on the ingress node in the IPv4 network is avoided. This reduces resource overheads. In addition, the head node further controls the end-to-end forwarding path.

Figure 7:
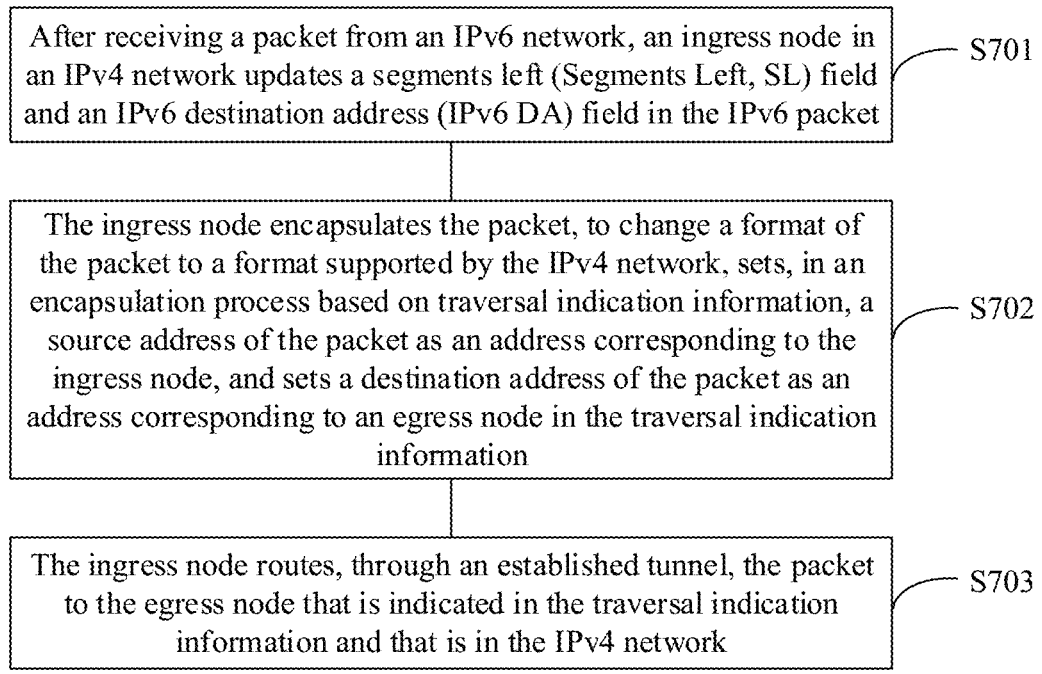
FIG. 7 is a flowchart of processing performed by an ingress node in an IPv4 network according to an embodiment of this application.

The following further describes the processing process performed by the ingress node in the IPv4 network. FIG. 7 is a flowchart of processing performed by an ingress node in an IPv4 network according to an embodiment of this application. The processing process includes the following steps.

S701: After receiving a packet from an IPv6 network, the ingress node in the IPv4 network updates a segment left (SL) field and an IPv6 DA field in the IPv6 packet.

After receiving the packet, if determining that a next packet header in the packet is an SRH, and that a value of the SL field is greater than zero, the ingress node performs the update operation. The update operation includes subtracting the value of the SL field by one, and replacing an address in the IPv6 DA field by using an SRH [SL]. For the update process, refer to the descriptions in FIG. 3. Details are not described herein again.

It should be noted that if the value of the SL field is equal to 0, it indicates that the packet has reached a destination node, and a packet transmission process ends. However, in this embodiment, the ingress node is not the destination node.

The scenario shown in FIG. 5 is still used as an example. When receiving the packet, the ingress node R3 modifies the value of the SL field to 2, and modifies the address in the IPv6 DA field to an address corresponding to an SRH [2].

S702: The ingress node encapsulates the packet, to change a format of the packet to a format supported by the IPv4 network, sets, in an encapsulation process based on traversal indication information, a source address of the packet as an address corresponding to the ingress node, and sets a destination address of the packet as an address corresponding to an egress node in the traversal indication information.

Further, after updating the IPv6 packet, the ingress node encapsulates an IPv4 packet header at an outer layer of the IPv6 packet, so that the packet can be transmitted in the IPv4 network. In the encapsulation process, the ingress node sets, based on the traversal indication information in the SID, a source address of the IPv4 packet header as an IPv4 address of the ingress node or an IPv4 address of an interface corresponding to the ingress node, and sets a destination address of the IPv4 packet header as an IPv4 address of the egress node in the traversal indication information or an IPv4 address of an interface corresponding to the egress node.

When the packet traverses the IPv4 network, a tunnel technology may be used for traversal. Different tunnel technologies have different encapsulation manners. That is, different tunnel encapsulation types may be used when the packet is encapsulated. The tunnel encapsulation type may be specified in the traversal indication information. In this embodiment, the traversal indication information indicates that an NVO3 tunnel encapsulation type is used. When the NVO3 tunnel encapsulation type is used, the IPv6 packet may traverse the IPv4 network through an overlay network, for example, a layer 2 tenant network. An overlay tunnel is established between the ingress node and the egress node in the IPv4 network, and the IPv6 packet completes traversal by using the overlay tunnel. An encapsulation manner of the NVO3 tunnel encapsulation type may include a VXLAN, a VXLAN-GPE, GENEVE, or the like.

To implement NVO3 tunnel encapsulation, the ingress node may further encapsulate a User Datagram Protocol (UDP) header at the outer layer of the packet, and set an overlay header and a UDP destination port that corresponds to an overlay protocol header. The process may include the following steps.

Set a UDP port number, where a destination port number is a port number corresponding to the overlay header, for example, VXLAN (4789), VXLAN-GPE (4790), or GENEVE (6081).

Figure 8:
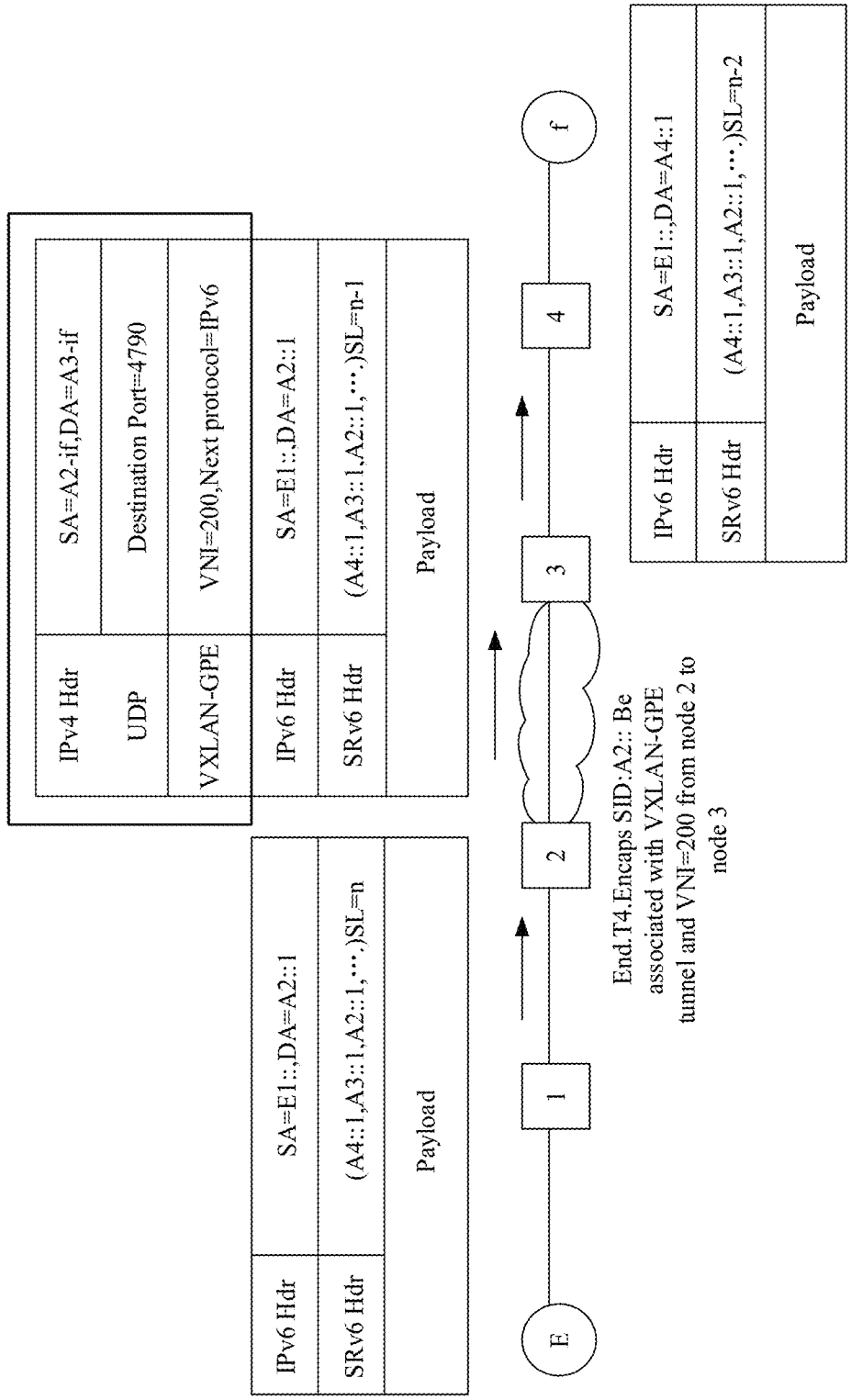
FIG. 8 is a schematic diagram of an application scenario in which a packet traverses an IPv4 network by using a VXLAN-GPE according to an embodiment of this application.

Fill a virtual network ID field based on an indication of the SID, for example, VXLAN network identifier (VNI) =200 in FIG. 8.

Set a Next-header field in the overlay header, for example, next protocol=IPv6 in FIG. 8.

Both the process of encapsulating the UDP header and the process of encapsulating the overlay header may be implemented by using an existing implementation, and details are not described herein.

It should be noted that some processing, involved in the encapsulation process, in a conventional technology is not changed in this embodiment of this application, and therefore is not listed herein one by one. For example, a hop limit of an inner IPv6 packet is decreased by one during encapsulation.

S703: The ingress node routes, through the established tunnel, the packet to the egress node that is indicated in the traversal indication information and that is in the IPv4 network.

After the packet reaches the egress node, the egress node decapsulates the packet and exposes the original IPv6 packet. Then, the egress node continues to perform forwarding in the IPv6 network according to an existing IPv6 or SRv6 forwarding process until the packet reaches the destination node.

For example, in FIG. 5, after the packet reaches the egress node R5, the egress node R5 decapsulates the packet and continues to forward the packet to a next node R6 until the packet reaches a destination node R7.

Examples in which the IPv4 network is traversed in different encapsulation manners, namely, the VXLAN, the VXLAN-GPE, and the GENEVE, are used for description below.

Figure 9:
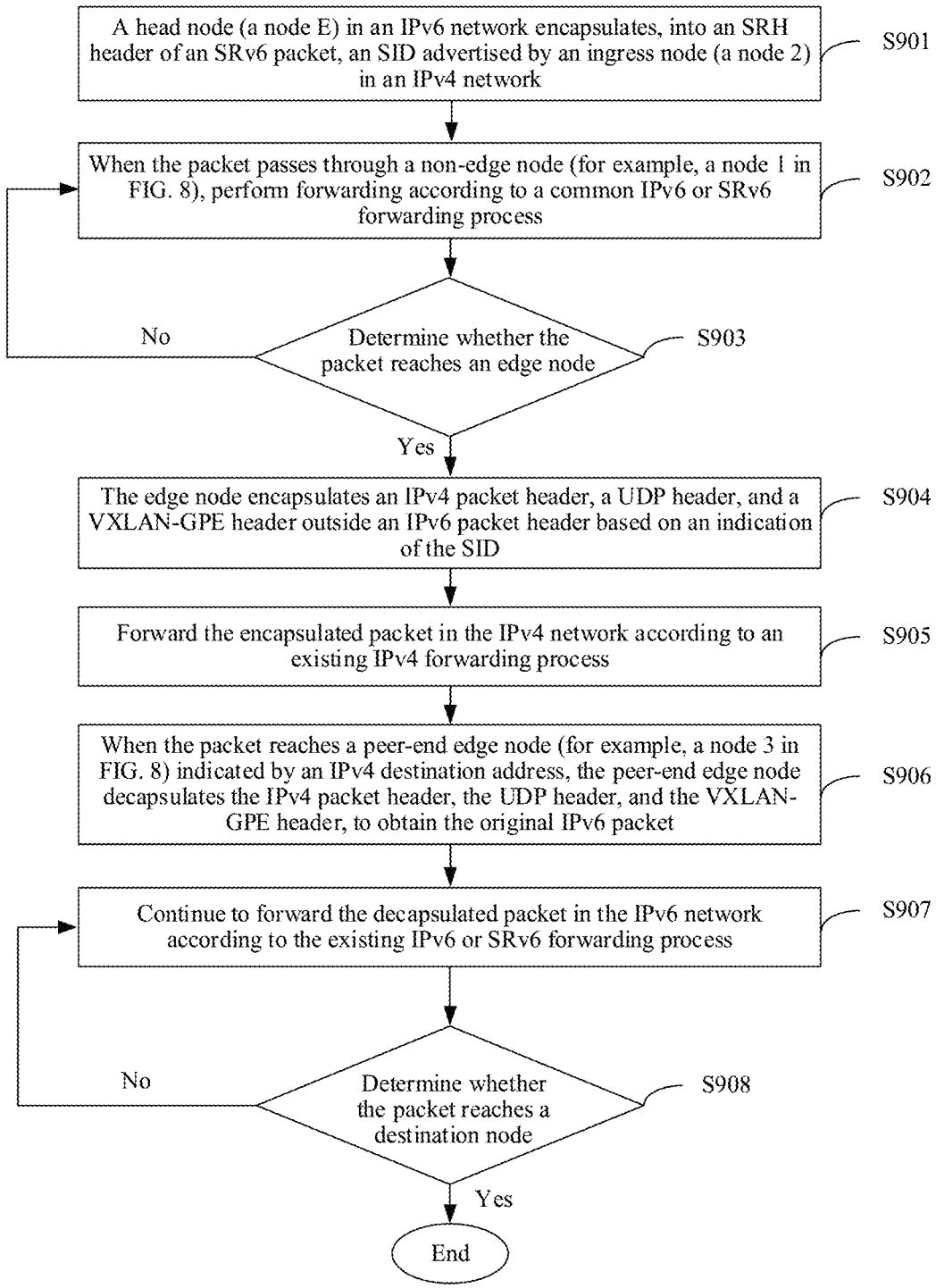
FIG. 9 is a flowchart of a method in which an SRv6 packet traverses an IPv4 network by using a VXLAN-GPE according to an embodiment of this application.

FIG. 8 is a diagram of an application scenario in which a packet traverses an IPv4 network by using a VXLAN-GPE according to an embodiment of this application. The following describes, by using FIG. 9, a processing process in the application scenario shown in FIG. 8. FIG. 9 is a flowchart of a method in which an SRv6 packet traverses an IPv4 network by using a VXLAN-GPE according to an embodiment of this application. The method includes the following steps.

S901: A head node (a node E) in an IPv6 network encapsulates, into an SRH header of the SRv6 packet, an SID advertised by an ingress node (a node 2) in an IPv4 network. In this embodiment, the head node in the IPv6 network is a head node of an SRv6 tunnel established in the IPv6 network, namely, the 1$^{st}$ node (namely, an ingress node of the packet in the SRv6 network) encountered after the packet enters the SRv6 tunnel, for example, the node E in FIG. 8 or the node R1 in FIG. 5.

The SID of the node 2 uses the new SID type provided in this embodiment of this application. An example of the SID is shown in FIG. 8. For a process in which the node E encapsulates the SID, refer to the embodiment shown in FIG. 6. Details are not described herein again.

S902: When the packet passes through a non-edge node (for example, a node 1 in FIG. 8), perform forwarding according to a common IPv6 or SRv6 forwarding process.

It should be noted that, in this embodiment of this application, an edge node is a node that supports IPv6/IPv4 dual stack, and is connected to both the IPv6 network and the IPv4 network. The 1$^{st}$ edge node reached by the packet in the transmission process is the ingress node in the IPv4 network.

S903: Determine whether the packet reaches the edge node (the node 2 in FIG. 8), and if the packet does not reach the edge node, perform step S902, or if the packet reaches the edge node (that is, reaches the ingress node in the IPv4 network), perform steps S904 to S908.

Step S904: The edge node encapsulates an IPv4 packet header, a UDP header, and a VXLAN-GPE header outside an IPv6 packet header based on an indication of the SID.

As shown in FIG. 8, when the packet reaches the node 2, the original packet is encapsulated based on the indication of the corresponding SID in the SRH (that is, an indication of traversal indication information in the SID) by using the VXLAN-GPE tunnel, and the IPv4 header and the UDP header are added before the VXLAN-GPE header, to traverse the IPv4 network between the node 2 and the node 3. A source address and a destination address of the IPv4 packet header may be respectively set to an interface address corresponding to the node 2 and an interface address corresponding to the node 3, a UDP destination port number is 4790, the VNI is set based on an indication of the SID (for example, VNI=200 in FIG. 8), and the next protocol field in the VXLAN-GPE is set to "0x2" corresponding to the IPv6. FIG. 10 shows a format of a packet encapsulated in a manner of this embodiment. For a specific implementation of an encapsulation process, refer to step S702 in the embodiment shown in FIG. 7. Details are not described herein again.

S905: Forward the encapsulated packet in the IPv4 network according to an existing IPv4 forwarding process.

For a specific implementation, refer to an existing IPv4 forwarding processing manner. Details are not described herein.

S906: When the packet reaches a peer-end edge node (for example, the node 3 in FIG. 8) indicated by the IPv4 destination address, the peer-end edge node decapsulates the IPv4 packet header, the UDP header, and the VXLAN-GPE header, to obtain the original IPv6 packet.

S907: Continue to forward the decapsulated packet in the IPv6 network according to the existing IPv6 or SRv6 forwarding process.

S908: Determine whether the packet reaches a target node (a node F in FIG. 8), and if the packet does not reach the target node, continue to perform step S907, or if the packet reaches the target node, end the packet forwarding process.

The foregoing is the embodiment in which the VXLAN-GPE is used to traverse the IPv4 network.

In another embodiment, the GENEVE may alternatively be used as an encapsulation manner to traverse the IPv4 network. A difference between a case in which the GENEVE is used as the encapsulation manner to traverse the IPv4 network and a case in which the VXLAN-GPE is used to traverse the IPv4 network lies in that when encapsulation in step S904 is performed, the overlay header is a GENEVE header, the destination port of the UDP header is 6081, and a protocol type field in the GENEVE header is set to 0x86DD. FIG. 11 shows a format of a packet encapsulated by using GENEVE as an encapsulation manner.

In another embodiment, the VXLAN may alternatively be used as an encapsulation manner to traverse the IPv4 network. A difference between a case in which the VXLAN is used as the encapsulation manner to traverse the IPv4 network and a case in which the VXLAN-GPE is used to traverse the IPv4 network lies in that when encapsulation in step S904 is performed, the overlay header is a VXLAN header, and the destination port of the UDP header is 4789.

There is no Next protocol field in the VXLAN. By default, the packet header following the VXLAN header is an Ethernet header, and a source media access control (MAC) address and a destination MAC address may be respectively set to an interface MAC address corresponding to the device 2 and an interface MAC address corresponding to the device 3. FIG. 12 shows a format of a packet encapsulated by using a VXLAN as an encapsulation manner.

In another embodiment, NVGRE may alternatively be used as an encapsulation manner to traverse the IPv4 network. A difference between a case in which the NVGRE is used as the encapsulation manner to traverse the IPv4 network and a case in which the VXLAN-GPE is used to traverse the IPv4 network lies in that when encapsulation in step S904 is performed, the overlay header is an NVGRE header, and there is no UDP header. FIG. 13 shows a format of a packet encapsulated by using NVGRE as an encapsulation manner.

In this embodiment of this application, the new type of SID is extended to carry the traversal indication information, so that the head node not only has a capability of selecting the path in the IPv6 network (where the capability is implemented by using the SRv6 SRH), but also has a capability of selecting the exit of the tunnel in the IPv4 network. Therefore, the end-to-end path is controlled.

The new type of SID extended in this embodiment of this application can implement not only controlling on the end-to-end path by the head node, but also copying between the IPv6 packet and the IPv4 packet. The following uses an example, in which an IOAM header (where IOAM is sometimes also referred to as in-band OAM, and this is not limited in this embodiment of this application) and/or a priority is copied, for description.

In an embodiment in which an IOAM header is copied between an IPv6 packet and an IPv4 packet, the IPv6 packet carries the IOAM header. A difference between this embodiment and the embodiment shown in FIG. 9 lies in that, in the packet forwarding process in step S902, information needs to be further collected along the path based on an indication of the IOAM header. In the packet encapsulation process in step S904, the edge node (the node 2) further copies the IOAM header in the IPv6 extension header to the IPv4 extension header or the overlay header. In the forwarding process in step S905, information is further collected along the path based on the indication of the IOAM header. In the decapsulation process in step S906, the IOAM header, in the IPv4 extension header or the overlay header, is further copied to the IPv6 extension header, and in the forwarding process in step S907, information is further collected along the path based on the indication of the IOAM header.

In the foregoing embodiment, before the IPv6/SRv6 header is encapsulated into the overlay tunnel, a part of information may be copied into the IPv4/overlay header. For example, IOAM information in IPv6/SRv6 header can be copied to the IPv4 header or the overlay header. When forwarding is performed in an IPv4 domain, a network device adds to-be-collected information to an IOAM field. The data collected by IOAM field can be copied back into the IPv6/SRv6 header at the exit of the overlay tunnel. In this way, IOAM data can be collected on the end-to-end path.

In an embodiment in which a priority is copied, an IPv6 packet carries an APP-ID. The APP-ID may be mapped to different SR policies to ensure service-level agreements (SLAs) of different applications. When the IPv6/SRv6 packet is forwarded in an IPv4 network, to ensure an SLA of an application in an IPv4 domain, the APP-ID can be mapped to a differentiated services code point (DSCP) field in an IPv4 packet header, to indicate a forwarding priority in the IPv4 domain. Further, in a packet encapsulation process, an ingress node in the IPv4 network may set, in the DSCP field in the IPv4 packet header, APP-ID information carried in an IPv6 Hop-by-hop header or an SRH header. When the packet is forwarded in the IPv4 network, a priority is matched based on DSCP.

By using the copy function provided in this embodiment of this application, a feature of the packet in the IPv6 network is retained when the packet traverses the IPv4 network.

It should be noted that all nodes in this embodiment of this application are network devices, and may be switches, routers, or the like in a network.

Figure 14:
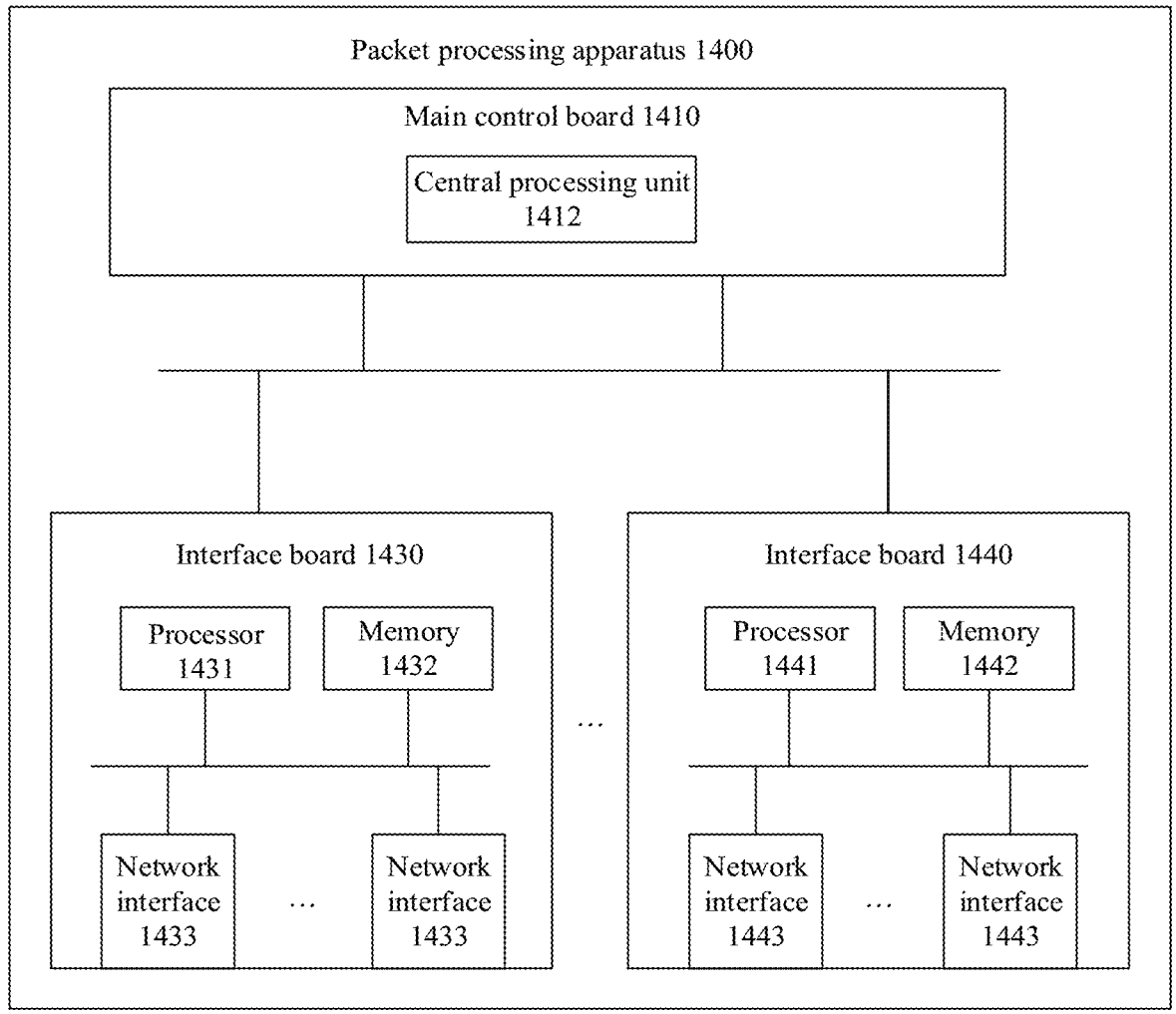
FIG. 14 is a schematic diagram of a structure of a packet processing apparatus according to an embodiment of this application.

FIG. 14 is a schematic diagram of a structure of a packet processing apparatus 1400 according to an embodiment of this application. The packet processing apparatus may be the node in the first network or the ingress node in the second network in any one of the foregoing embodiments. The node in the first network in the embodiments of this application is a head node of an SR tunnel established in the first network. The packet processing apparatus 1400 may be a switch, a router, or another network device that forwards a packet. In this embodiment, the packet processing apparatus 1400 includes a main control board 1410, an interface board 1430, and an interface board 1440. When there are a plurality of interface boards, a switching board (not shown in the figure) may be included. The switching board is configured to exchange data between the interface boards (or a line card or a service board).

The main control board 1410 is configured to complete functions such as system management, device maintenance, and protocol processing. The interface boards 1430 and 1440 are configured to provide various service interfaces (for example, a Packet over SONET/SDH (POS) interface, a Gigabit Ethernet (GE) interface, and an Asynchronous Transfer Mode (ATM) interface), and forward a packet. The main control board 1410 mainly includes three types of function units: a system management and control unit, a system clock unit, and a system maintenance unit. The main control board 1410, the interface board 1430, and the interface board 1440 are connected to a system backboard by using a system bus to implement interworking. The interface board 1430 includes one or more processors 1431. The processor 1431 is configured to control and manage the interface board, communicate with a central processing unit on the main control board, and forward a packet. A memory 1432 on the interface board 1430 is configured to store a forwarding entry, and the processor 1431 forwards a packet by searching the forwarding entry stored in the memory 1432.

The interface board 1430 includes one or more network interfaces 1433, configured to receive a probe packet sent by a previous-hop network node, and send a processed probe packet to a next-hop network node based on an indication of the processor 1431. For a specific implementation process, refer to steps S601 and S603 in the embodiment shown in FIG. 6, steps S701 and S703 in the embodiment shown in FIG. 7, or steps S902, S905, and S907 in the embodiment shown in FIG. 9.

The processor 1431 is configured to perform processing steps and functions of the node in the first network or the ingress node in the second network described in the foregoing method embodiments. For details, refer to steps S601 and S602 in the embodiment shown in FIG. 6, steps S701 and S702 in the embodiment shown in FIG. 7, or steps S901 to S908 in the embodiment shown in FIG. 9. Details are not described herein one by one again.

It should be noted that, as shown in FIG. 14, this embodiment includes a plurality of interface boards, and uses a distributed forwarding mechanism. In this mechanism, operations on the interface board 1440 are basically similar to operations on the interface board 1430. For brevity, details are not described again.

In addition, it should be noted that the processor 1431 on the interface board 1430 and/or the processor 1441 in FIG. 14 may be dedicated hardware or a chip, for example, a network processor or an application-specific integrated circuit (ASIC), to implement the foregoing functions. This implementation is generally referred to as a manner of using dedicated hardware or a chip for processing on a forwarding plane. For a specific implementation of using the network processor, namely, the dedicated hardware or the chip, refer to descriptions of an embodiment shown in FIG. 15. In another implementation, the processor 1431 and/or 1441 may alternatively be a general-purpose processor, for example, a general-purpose central processing unit (CPU), to implement the foregoing described functions. For an implementation of the general-purpose CPU, refer to descriptions in embodiments shown in FIG. 18 and FIG. 19.

In addition, it should be noted that there may be one or more main control boards, and when there is a plurality of main control boards, the main control boards may include an active main control board and a standby main control board. There may be one or more interface boards, and a device having a stronger data processing capability provides more interface boards. If there are a plurality of interface boards, the plurality of interface boards can communicate with each other by using one or more switching boards, and the plurality of interface boards can jointly implement load sharing and redundancy backup. In a centralized forwarding architecture, the device may not need the switching board, and the interface board provides a function of processing service data of an entire system. In a distributed forwarding architecture, the device includes a plurality of interface boards. Data exchange between the plurality of interface boards may be implemented by using a switching board, and the plurality of interface boards can provide a large-capacity data exchange and processing capability. Therefore, a data access and processing capability of a network device in the distributed architecture is better than that of a device in the centralized architecture. A specific architecture that is to be used depends on a specific networking deployment scenario. This is not limited herein.

In a specific embodiment, the memory 1432 may be a read-only memory (ROM), another type of static storage device that can store static information and instructions, a random-access memory (RAM), or another type of dynamic storage device that can store information and instructions, or may be an electrically erasable programmable ROM (EEPROM), a compact disc (CD) ROM (CD-ROM) or another compact disc storage, an optical disc storage (including a compact optical disc, a laser disc, an optical disc, a digital versatile disc (DVD), a BLU-RAY disc, and the like), a magnetic disk storage medium or another magnetic storage device, or any other medium that can be used to carry or store expected program code in a form of an instruction or a data structure and that can be accessed by a computer. However, the memory is not limited thereto. The memory 1432 may exist independently, and is connected to the processor 1431 by using a communication bus. The memory 1432 may alternatively be integrated with the processor 1431.

The memory 1432 is configured to store program code, and execution is controlled by the processor 1431, to perform the packet processing method provided in the foregoing embodiment. The processor 1431 is configured to execute the program code stored in the memory 1432. The program code may include one or more software modules. The one or more software modules may be a software module provided in an embodiment in any one of FIG. 16 or FIG. 17.

In a specific embodiment, the network interface 1433 may be an apparatus that uses any transceiver, and is configured to communicate with another device or a communication network, for example, the Ethernet, a radio access network (RAN), or a wireless local area network (WLAN).

Figure 15:
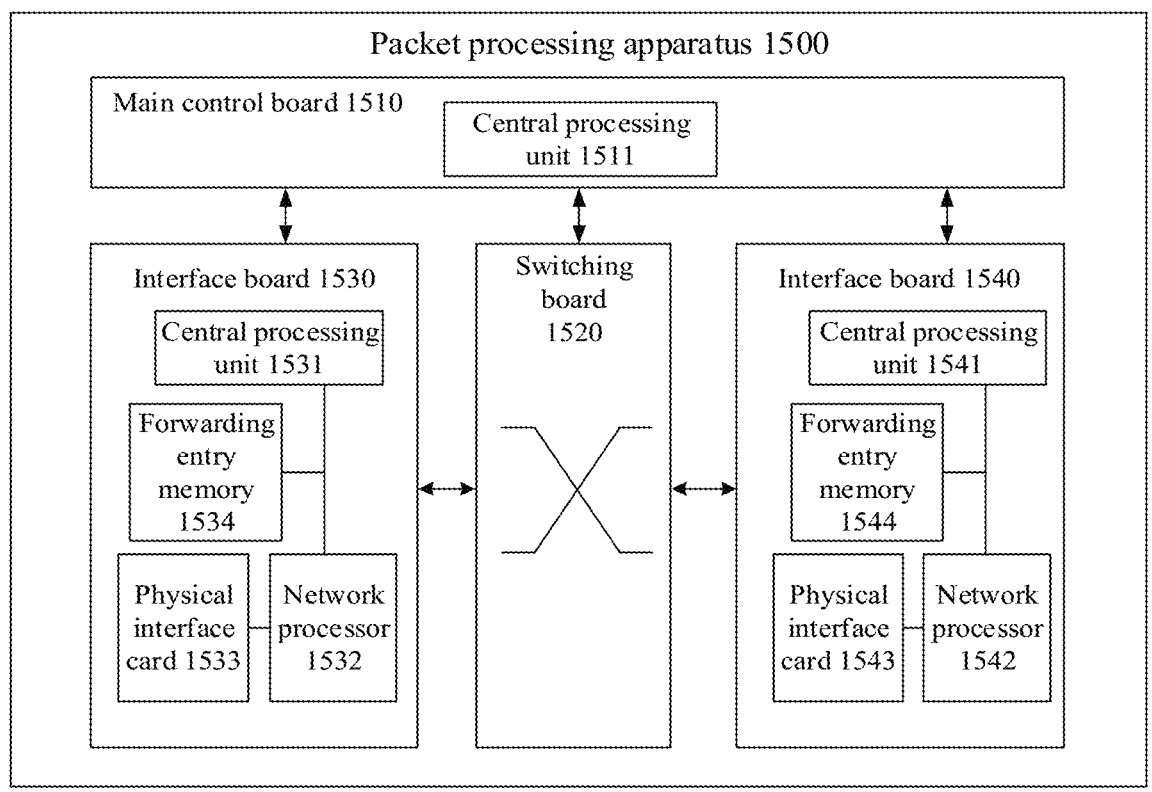
FIG. 15 is a schematic diagram of a structure of a packet processing apparatus according to an embodiment of this application.

FIG. 15 is another schematic diagram of a structure of a packet processing apparatus 1500 according to an embodiment of this application. The packet processing apparatus may be the node in the first network or the ingress node in the second network in any one of the foregoing embodiments. The node in the first network in the embodiments of this application is a head node of an SR tunnel established in the first network. The packet processing apparatus 1500 may be a switch, a router, or another network device that forwards a packet. In this embodiment, the packet processing apparatus 1500 includes a main control board 1510, an interface board 1530, a switching board 1520, and an interface board 1540. The main control board 1510 is configured to complete functions such as system management, device maintenance, and protocol processing. The switching board 1520 is configured to exchange data between the forwarding boards (or a line card or a service board). The interface boards 1530 and 1540 are configured to provide various service interfaces (for example, a POS interface, a GE interface, and an ATM interface), and forward a data packet. A control plane includes management and control units on the main control board 1510 and management and control units on the interface board 1530 and the interface board 1540. The main control board 1510 mainly includes three types of function units: a system management and control unit, a system clock unit, and a system maintenance unit. The main control board 1510, the interface boards 1530 and 1540, and the switching board 1520 are connected to a system backboard by using a system bus to implement interworking. A central processing unit 1531 on the interface board 1530 is configured to control and manage the interface board, and communicate with a central processing unit on a main control board. A forwarding entry memory 1534 on the interface board 1530 is configured to store a forwarding entry, and a network processor 1532 forwards a packet by searching the forwarding entry stored in the forwarding entry memory 1534.

The interface board 1530 includes one or more network interfaces 1533, configured to receive a probe packet sent by a previous-hop network node, and send a processed probe packet to a next-hop network node based on an indication of the processor 1531. For a specific implementation process, refer to steps S601 and S603 in the embodiment shown in FIG. 6, steps S701 and S703 in the embodiment shown in FIG. 7, or steps S902, S905, and S907 in the embodiment shown in FIG. 9. Details are not described herein one by one again.

The processor 1532 is configured to perform processing steps and functions of the node in the first network or the ingress node in the second network described in the foregoing method embodiments. For details, refer to steps S601 and S602 in the embodiment shown in FIG. 6, steps S701 and S702 in the embodiment shown in FIG. 7, or steps S901 to S908 in the embodiment shown in FIG. 9. Details are not described herein one by one again.

It should be noted that, as shown in FIG. 15, this embodiment includes a plurality of interface boards, and uses a distributed forwarding mechanism. In this mechanism, operations on the interface board 1540 are basically similar to operations on the interface board 1530. For brevity, details are not described again. In addition, as described above, functions of the network processors 1532 and 1542 in FIG. 15 may be replaced with that of an ASIC.

In addition, it should be noted that there may be one or more main control boards, and when there is a plurality of main control boards, the main control boards may include an active main control board and a standby main control board. There may be one or more interface boards, and a device having a stronger data processing capability provides more interface boards. There may also be one or more physical interface cards on the interface board. There may be no switching board or one or more switching boards. When there is a plurality of switching boards, load sharing and redundancy backup may be implemented together. In a centralized forwarding architecture, the device may not need the switching board, and the interface board provides a function of processing service data of an entire system. In a distributed forwarding architecture, the device may include at least one switching board, and data exchange between a plurality of interface boards is implemented by using the switching board, to provide a large-capacity data exchange and processing capability. Therefore, a data access and processing capability of a network device in the distributed architecture is better than that of a device in the centralized architecture. A specific architecture that is to be used depends on a specific networking deployment scenario. This is not limited herein.

Figure 16:
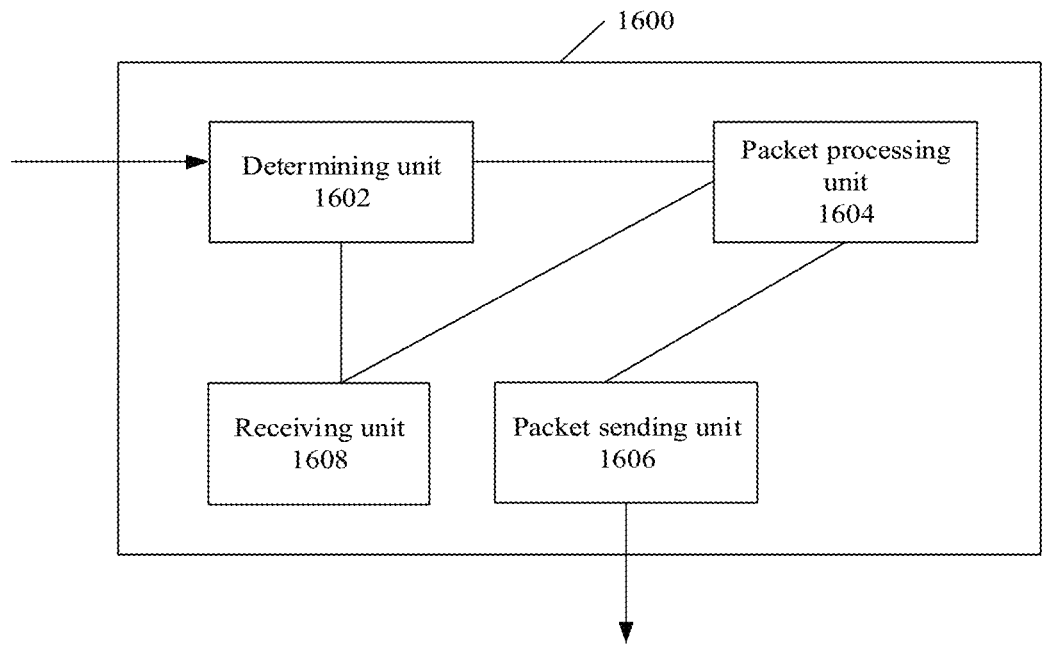
FIG. 16 is a schematic diagram of a structure of a packet processing apparatus according to an embodiment of this application.

Refer to FIG. 16. An embodiment of this application further provides a packet processing apparatus 1600. The apparatus may be used in a node in a network. The node is a head node of an SR tunnel established in the network. For example, the node may implement a function of the head node of the SR tunnel shown in FIG. 6 or FIG. 9. In a specific embodiment, the packet processing apparatus includes a determining unit 1602, a packet processing unit 1604, and a packet sending unit 1606.

The determining unit 1602 is configured to perform step S601 in the embodiment shown in FIG. 6, that is, determine an end-to-end transmission path for a packet, where the transmission path includes a transmission path in a first network and a path traversing a second network.

The packet processing unit 1604 is configured to perform step S602 in the embodiment shown in FIG. 6, that is, add end-to-end path information to the packet based on the determined transmission path, where the path information includes traversal indication information, and the traversal indication information indicates an egress node of the packet in the second network.

The packet sending unit 1606 is further configured to send the packet processed by the packet processing unit 1604. Further, the packet sending unit 1606 may send, to an ingress node in the second network through the first network, the packet to which the traversal indication information is added, to indicate the ingress node in the second network to encapsulate and transmit the packet based on the egress node that is specified in the traversal indication information and that is located in the second network. For a specific implementation process, refer to step S601 in the embodiment shown in FIG. 6 and step S901 in the embodiment shown in FIG. 9. Details are not described herein again.

In a specific implementation, the packet processing apparatus 1600 may further include a receiving unit 1608, configured to receive at least one SID advertised by the ingress node in the second network, where different SIDs advertised by the ingress node carry different traversal indication information.

When adding the end-to-end path information to the packet, the packet processing unit 1604 uses an SID corresponding to the path that is determined by the determining unit based on the traversal indication information and that traverses the second network as the SID of the ingress node in the second network, and adds the SID to the end-to-end path information.

For a specific implementation process of the receiving unit 1608 and the packet processing unit 1604, refer to the descriptions of the processing process of R3 node in the embodiment shown in FIG. 5 and the descriptions of step S901 in the embodiment shown in FIG. 9. Details are not described herein again.

Figure 17:
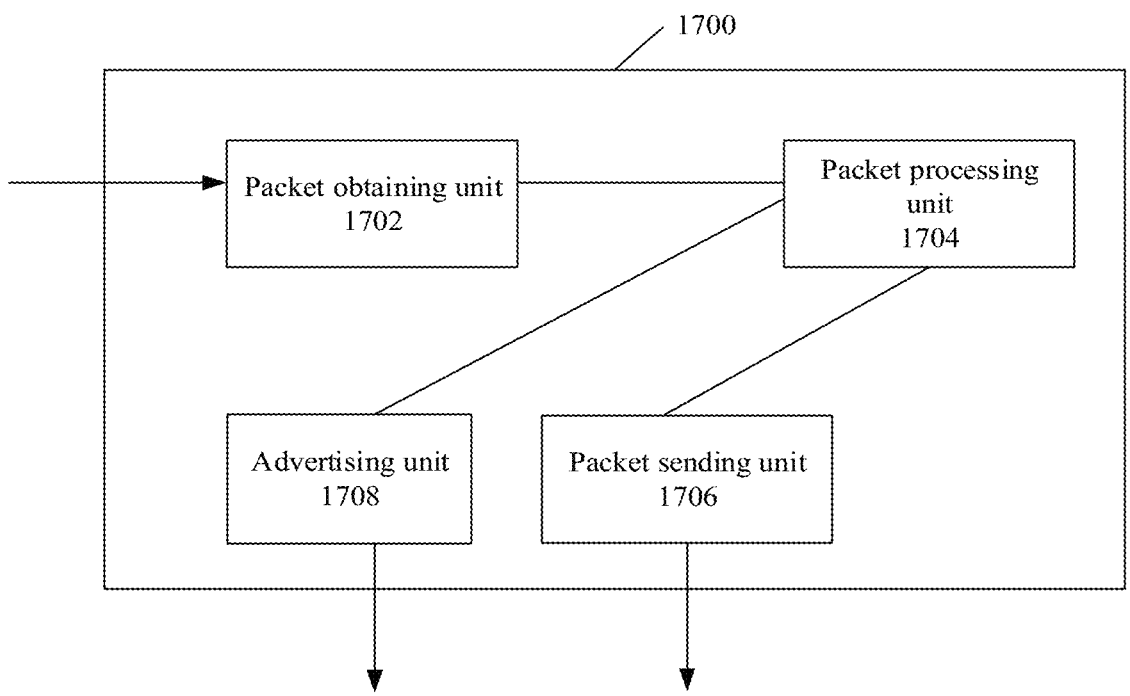
FIG. 17 is a schematic diagram of a structure of a packet processing apparatus according to an embodiment of this application.

Refer to FIG. 17. An embodiment of this application further provides a packet processing apparatus 1700. The apparatus may be used in an edge node in a network, and the node may implement a function of the ingress node shown in FIG. 7 or FIG. 9.

In a specific embodiment, the packet processing apparatus includes a packet obtaining unit 1702, a packet processing unit 1704, and a packet sending unit 1706.

The packet obtaining unit 1502 is configured to receive a packet from a first network, where the packet carries traversal indication information, and the traversal indication information indicates an egress node of the packet in a second network. For a specific implementation process, refer to specific descriptions in the embodiments shown in FIG. 7 and FIG. 9. Details are not described herein again.

The packet processing unit 1704 is configured to encapsulate the packet based on the traversal indication information, to change a format of the packet to a format supported by the second network, where a destination address of the encapsulated packet is the egress node indicated in the traversal indication information. For a specific implementation process, refer to step 702 in the embodiment shown in FIG. 7.

The packet sending unit 1706 is configured to route the encapsulated packet to the egress node.

In a specific implementation, the packet processing apparatus 1700 may further include an advertising unit 1708, configured to advertise at least one SID, where the SID carries the traversal indication information, and when a plurality of SIDs are advertised, different SIDs carry different traversal indication information. For a specific implementation process, refer to the descriptions of the processing process of R3 node in the embodiment shown in FIG. 5 and the descriptions of step S901 in the embodiment shown in FIG. 9.

Figure 18:
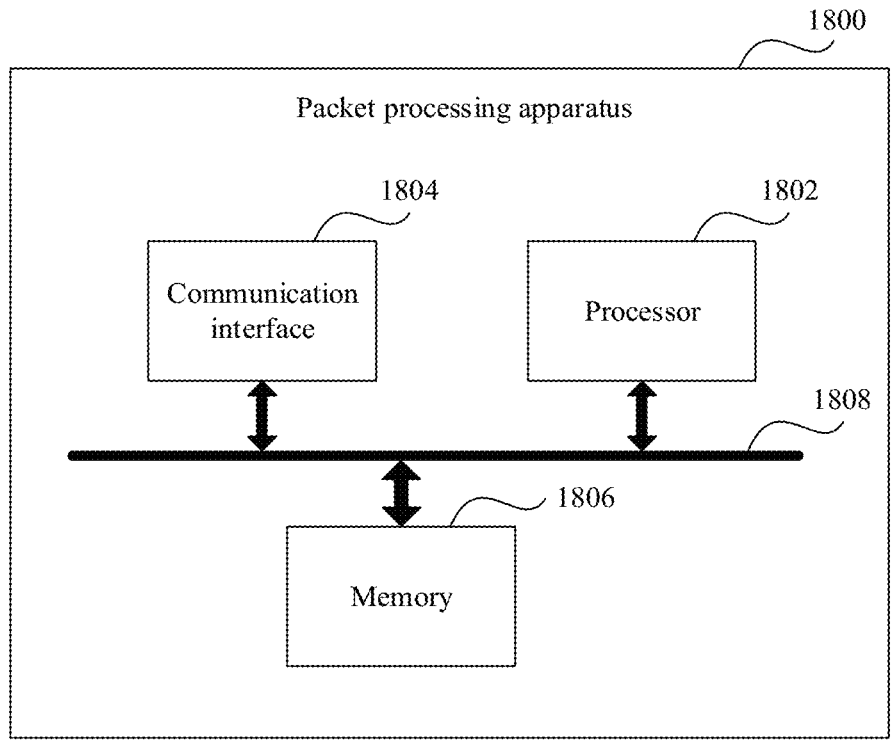
FIG. 18 is a schematic diagram of a structure of a packet processing apparatus according to an embodiment of this application.

Refer to FIG. 18. An embodiment of this application provides a packet processing apparatus 1800. The packet processing apparatus 1800 may implement the function of the head node of the SR tunnel in the embodiments shown in FIG. 6 and FIG. 9. The packet processing apparatus includes at least one processor 1802 and at least one communication interface 1804.

In addition, a memory 1806 may be further included, configured to store instructions. The memory 1806 may be a cache memory inside the processor, or may be a memory outside the processor. When the units described in the embodiment of FIG. 16 are implemented by using software, software or program code required for performing the functions of the packet processing unit 1604 and the packet sending unit 1606 in FIG. 16 is stored in the memory 1806.

The processor 1802 is configured to execute the instructions in the memory 1806, to perform the foregoing processing steps applied to the head node of the SR tunnel in the embodiment shown in FIG. 6 or FIG. 9.

The communication interface 1804 is configured to perform communication.

The memory 1806 (when the processor is external), the processor 1802, and the communication interface 1804 are connected to each other by using a bus 1808. The bus 1808 may be a Peripheral Component Interconnect (PCI) bus, an Extended Industry Standard Architecture (EISA) bus, or the like. Buses may be classified into an address bus, a data bus, a control bus, and the like. For ease of representation, only one thick line is used to represent the bus in FIG. 18, but this does not mean that there is only one bus or only one type of bus.

In a specific embodiment, the processor 1802 is configured to determine an end-to-end transmission path for a packet, add end-to-end path information to the packet based on the determined transmission path, and send, to an ingress node in the second network through the communication interface 1804, the packet to which traversal indication information is added. For a specific process, refer to specific descriptions in FIG. 6 and FIG. 9. Details are not described herein again.

Figure 19:
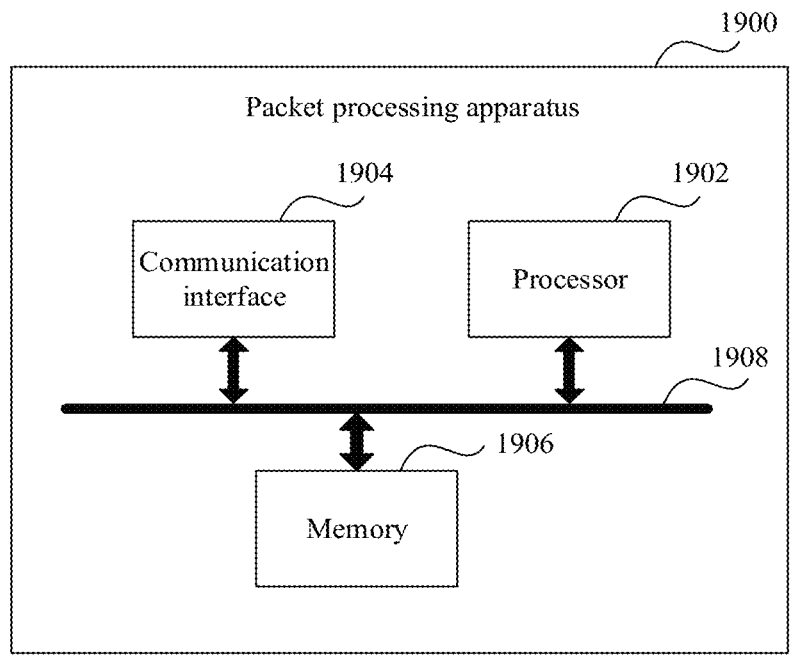
FIG. 19 is a schematic diagram of a structure of a packet processing apparatus according to an embodiment of this application.

Refer to FIG. 19. An embodiment of this application provides a packet processing apparatus 1900. The packet processing apparatus 1900 may implement the function of the ingress node in the embodiments shown in FIG. 7 and FIG. 9. The packet processing apparatus includes at least one processor 1902 and at least one communication interface 1904.

In addition, a memory 1906 may be further included, configured to store instructions. The memory 1906 may be a cache memory inside the processor, or may be a memory outside the processor. When the units described in the embodiment of FIG. 17 are implemented by using software, software or program code required for performing the functions of the packet processing unit 1704 and the packet sending unit 1706 in FIG. 17 is stored in the memory 1906.

The processor 1902 is configured to execute the instructions in the memory 1906, to perform the foregoing processing steps applied to the ingress node in the embodiments shown in FIG. 7 and FIG. 9.

The communication interface 1904 is configured to perform communication.

The memory 1906 (when the processor is external), the processor 1902, and the communication interface 1904 are connected to each other by using a bus 1908. The bus 1908 may be a PCI bus, an EISA bus, or the like. Buses may be classified into an address bus, a data bus, a control bus, and the like. For ease of representation, only one thick line is used to represent the bus in FIG. 19, but this does not mean that there is only one bus or only one type of bus.

In a specific embodiment, the processor 1902 is configured to receive a packet from a first network, encapsulate the packet based on traversal indication information in the packet, to change a format of the packet to a format supported by a second network, set a destination address of the encapsulated packet as an egress node indicated in the traversal indication information, and route the encapsulated packet to the egress node. For a specific process, refer to specific descriptions in the embodiments shown in FIG. 7 and FIG. 9. Details are not described herein again.

The communication interface 1904 is configured to send and receive a packet. For a specific process, refer to specific descriptions in the embodiments shown in FIG. 7 and FIG. 9. Details are not described herein again.

The memory 1806 or the memory 1906 may be a RAM, a flash, a ROM, an erasable programmable ROM (EPROM), an EEPROM, a register, a hard disk, a removable hard disk, a CD-ROM, or any other form of storage medium known to a person skilled in the art, or may be a cache in a processor.

The processor 1802 or the processor 1902 may be, for example, a CPU, a network processor, a general-purpose processor, a digital signal processor (DSP), an ASIC, a field-programmable gate array (FPGA), or another programmable logic component, a transistor logic device, a hardware component, or any combination thereof. The processing module may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor.

The communication interface 1804 or the communication interface 1904 may be, for example, an interface card, and may be an Ethernet interface or an ATM interface.

An embodiment of this application further provides a chip. The chip is disposed in the packet processing apparatus shown in FIG. 16 or FIG. 18. The packet processing apparatus is the head node of the SR tunnel in the method embodiment. The chip includes a processor and an interface circuit.

The interface circuit is configured to receive instructions and transmit the instructions to the processor.

The processor is configured to receive the instructions from the interface circuit, and execute the foregoing processing steps that are applied to the head node of the SR tunnel in the embodiments shown in FIG. 6 and FIG. 9.

In a specific embodiment, the processor is configured to determine an end-to-end transmission path for a packet, add end-to-end path information to the packet based on the determined transmission path, and send, to an ingress node in a second network through the communication interface 1804, the packet to which traversal indication information is added. For a specific process, refer to specific descriptions in FIG. 6 and FIG. 9. Details are not described herein again.

An embodiment of this application further provides a chip. The chip is disposed in the packet processing apparatus shown in FIG. 17 or FIG. 19. The packet processing apparatus is the ingress node in the method embodiment. The chip includes a processor and an interface circuit.

The interface circuit is configured to receive instructions and transmit the instructions to the processor.

The processor is configured to receive the instructions from the interface circuit, and execute the foregoing processing steps that are applied to the ingress node in the embodiments shown in FIG. 7 and FIG. 9.

In a specific embodiment, the processor is configured to receive a packet from a first network, encapsulate the packet based on traversal indication information in the packet, to change a format of the packet to a format supported by a second network, set a destination address of the encapsulated packet as an egress node indicated in the traversal indication information, and route the encapsulated packet to the egress node. For a specific process, refer to specific descriptions in the embodiments shown in FIG. 7 and FIG. 9. Details are not described herein again.

An embodiment of this application further provides a network system. The network system includes a device in a first network and a device in a second network. The device in the first network includes a node, and the device in the second network includes an edge node connected to the first network. The edge node is also located in the first network, and supports transmission protocols of the first network and the second network. A packet sent by the node in the first network passes through the edge node in the second network and reaches a destination node through the second network. The node in the first network in the embodiments of this application is a head node of an SR tunnel established in the first network.

The node in the network system may perform steps of the head node of the SR tunnel in the embodiments shown in FIG. 6 and FIG. 9, and details are not described herein again. Alternatively, correspondingly, the node in the network system is the packet processing apparatus 1600 or 1800 in the embodiment shown in FIG. 16 or FIG. 18.

The edge node in the network system may perform steps of the ingress node in the embodiments shown in FIG. 7 and FIG. 9, and details are not described herein again. Alternatively, correspondingly, the edge node in the network system is the packet processing apparatus 1700 or 1900 in the embodiment shown in FIG. 17 or 19.

An embodiment of this application further provides a computer-readable storage medium, including instructions. When the instructions are run on a computer, the computer is enabled to perform the foregoing packet processing method applied to the packet processing apparatus 1600.

An embodiment of this application further provides a computer-readable storage medium, including instructions. When the instructions are run on a computer, the computer is enabled to perform the packet processing method applied to the packet processing apparatus 1800.

It may be clearly understood by a person skilled in the art that, for purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus and method may be implemented in other manners. For example, the described apparatus embodiment is merely an example. For example, the unit division is merely logical service division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected based on an actual requirement to achieve the objectives of the solutions of the embodiments.

In addition, service units in the embodiments of this application may be integrated into one processing unit, or each of the units may exist alone physically, or two or more units are integrated into one unit. The integrated unit may be implemented in a form of hardware, or may be implemented in a form of a software service unit.

When the service unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The software product is stored in a storage medium and includes a plurality of instructions for instructing a computer device (which may be a personal computer, a server, or a network device) to perform all or some of the steps of the methods described in the embodiments of this application. The storage medium includes any medium that can store program code, such as a Universal Serial Bus (USB) flash drive, a removable hard disk, a ROM, a RAM, a magnetic disk, or an optical disc.

Persons skilled in the art should be aware that in the foregoing one or more examples, the services described in the present disclosure may be implemented by using hardware, software, firmware, or any combination thereof. When the present disclosure is implemented by software, the services may be stored in a computer-readable medium or transmitted as one or more instructions or code in the computer-readable medium. The computer-readable medium includes a computer storage medium and a communication medium, where the communication medium includes any medium that facilitates transmission of a computer program from one place to another. The storage medium may be any available medium accessible to a general-purpose or dedicated computer.

The objectives, technical solutions, and beneficial effects of the present disclosure have been described in further detail in the foregoing specific implementations. It should be understood that the foregoing descriptions are merely specific implementations of the present disclosure.

The foregoing embodiments are merely intended for describing the technical solutions of this application instead of limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A method, comprising:
    obtaining, for a packet, a transmission path comprising a first path in a first network and a second path traversing a second network;
    adding, to the packet based on the transmission path, path information comprising traversal indication information, wherein the traversal indication information indicates an egress node of the packet in the second network, wherein a format of the packet corresponds to an Internet Protocol (IP) version 6 (IPv6) network, and wherein the egress node is in an IP version 4 (IPv4) network; and
    sending, based on the path information, the packet to an ingress node in the second network through the first network to instruct the ingress node to transmit the packet based on the egress node and to change the format of the packet from an IPV6 network format to an IPV4 network format.

2. The method of claim 1, wherein the path information further comprises a first segment identifier (SID) of an intermediate node on the first path and a second SID of the ingress node, and wherein the traversal indication information is comprised in the second SID.

3. The method of claim 2, wherein before obtaining the transmission path, the method further comprises:
receiving at least one SID from the ingress node, wherein different SIDs from the ingress node carry different traversal indication information; and
when adding the path information to the packet:
obtaining, based on the traversal indication information, a third SID corresponding to the second path;
setting the third SID as the second SID; and
adding the third SID to the path information.

4. The method of claim 1, wherein the traversal indication information further indicates a tunnel encapsulation type used when the packet traverses the second network, and wherein the packet further instructs the ingress node to encapsulate the packet based on the tunnel encapsulation type.

5. The method of claim 4, wherein the tunnel encapsulation type is network virtualization over layer 3 (NVO3).

6. The method of claim 5, wherein the traversal indication information further indicates content to be copied during encapsulation, and wherein the packet further instructs the ingress node to copy, when encapsulating the packet, the content from a first packet header of a first protocol supported by the first network to a second packet header of a second protocol supported by the second network.

7. A method, comprising:
receiving, from a first network, a packet carrying traversal indication information, wherein the traversal indication information indicates an egress node of the packet in a second network, wherein a first format of the packet corresponds to an Internet Protocol (IP) version 6 (IPv6) network, and wherein the egress node is in an IP version 4 (IPv4) network;
encapsulating, based on the traversal indication information, the packet to obtain an encapsulated packet by changing the first format of the packet to a second format supported by the second network, wherein the first format comprises an IPV6 network format, wherein the second format comprises an IPV4 network format, and wherein a destination address of the encapsulated packet is of the egress node; and
routing, to the egress node, the encapsulated packet.

8. The method of claim 7, wherein the packet further carries a segment identifier (SID) of an ingress node, and wherein the traversal indication information is in the SID.

9. The method of claim 7, wherein the first network is the IPV6 network, wherein the second network is the IPV4 network, and wherein the method further comprises:
encapsulating an IPV4 packet header outside the packet;
setting a source address of the IPV4 packet header as either a first IPV4 address of an ingress node or a second IPv4 address of a first interface corresponding to the ingress node; and
setting a destination address of the IPV4 packet header as either a third IPV4 address of the egress node in the traversal indication information or a fourth IPV4 address of a second interface corresponding to the egress node.

10. The method of claim 9, wherein the traversal indication information further indicates content to be copied during encapsulation, and wherein when encapsulating the packet, the method further comprises copying, to the IPV4 packet header, the content.

11. The method of claim 7, wherein the traversal indication information further indicates a tunnel encapsulation type used when the packet traverses the second network, and wherein the method further comprises establishing a transmission tunnel to the egress node based on the tunnel encapsulation type.

12. The method of claim 11, wherein the tunnel encapsulation type is network virtualization over layer 3 (NVO3).

13. The method of claim 7, wherein before receiving the packet, the method further comprises advertising at least one segment identifier (SID), and wherein different advertised SIDs carry different traversal indication information.

14. An apparatus, comprising:
one or more processors; and
a memory coupled to the one or more processors and configured to store instructions, that when executed by the one or more processors, cause the apparatus to:
obtain, for a packet, a transmission path comprising a first path in a first network and a second path traversing a second network;
add, to the packet based on the transmission path, path information comprising traversal indication information, wherein the traversal indication information indicates an egress node of the packet in the second network, wherein a format of the packet corresponds to an Internet Protocol (IP) version 6 (IPv6) network, and wherein the egress node is in an IP version 4 (IPv4) network; and
send, based on the path information, the packet to an ingress node in the second network through the first network to instruct the ingress node to transmit the packet based on the egress node and to change the format of the packet from an IPV6 network format to an IPv4 network format.

15. The apparatus of claim 14, wherein the path information further comprises a first segment identifier (SID) of an intermediate node on the first path and a second SID of the ingress node, and wherein the traversal indication information is comprised in the second SID.

16. The apparatus of claim 15, wherein when executed by the one or more processors, the instructions further cause the apparatus to:
receive at least one SID from the ingress node, wherein different SIDs from the ingress node carry different traversal indication information; and
when adding the path information to the packet:
obtain, based on the traversal indication information, a third SID corresponding to the second path;
set the third SID as the second SID; and
add the third SID to the path information.

17. The apparatus of claim 14, wherein the traversal indication information further indicates content to be copied during encapsulation, and wherein the packet further instructs the ingress node to copy, when encapsulating the packet, the content from a first packet header of a first protocol supported by the first network to a second packet header of a second protocol supported by the second network.

18. An apparatus, comprising:
one or more processors; and
a memory coupled to the one or more processors and configured to store instructions, that when executed by the one or more processors, the instructions to cause the apparatus to:
receive, from a first network, a packet carrying traversal indication information, wherein the traversal indication information indicates an egress node of the packet in a second network, wherein a first format of the packet corresponds to an Internet Protocol (IP) version 6 (IPv6) network, and wherein the egress node is in an IP version 4 (IPv4) network;

encapsulate, based on the traversal indication information, the packet to obtain an encapsulated packet by changing the first format of the packet to a second format supported by the second network, wherein the first format comprises an IPV6 network format, wherein the second format comprises an IPV4 network format, and wherein a destination address of the encapsulated packet is the egress node; and route, to the egress node, the encapsulated packet.

19. The apparatus of claim 18, wherein the packet further carries a segment identifier (SID) of an ingress node, and wherein the traversal indication information is carried in the SID.

20. The apparatus of claim 18, wherein the first network is the IPV6 network, wherein the second network is the IPv4 network, and wherein the one or more processors are further configured to execute the instructions to cause the apparatus to:

encapsulate an IPv4 packet header outside the packet;

set a source address of the IPV4 packet header as either a first IPV4 address of an ingress node or a second IPv4 address of a first interface corresponding to the ingress node; and set a destination address of the IPV4 packet header as either a third IPV4 address of the egress node in the traversal indication information or a fourth IPv4 address of a second interface corresponding to the egress node.

\* \* \* \* \*